_US005281099A_

United States Patent [19]
Hunter et al.

[11] Patent Number: 5,281,099
[45] Date of Patent: Jan. 25, 1994

[54] INTEGRATED SPLINE/CONE SEAT SUBASSEMBLY FOR A ROTOR ASSEMBLY HAVING DUCTED, COAXIAL COUNTER-ROTATING ROTORS

[75] Inventors: David H. Hunter, Cheshire; Timothy A. Krauss, Harwinton; Vincent F. Millea, Stratford, all of Conn.

[73] Assignee: United Technologies Corporation, Hartford, Conn.

[21] Appl. No.: 903,064

[22] Filed: Jun. 22, 1992

[51] Int. Cl.⁵ .............................................. B64C 11/02
[52] U.S. Cl. .......................... 416/244 R; 416/204 R; 403/359
[58] Field of Search .......... 416/244 R, 244 A, 244 D, 416/204 R; 403/359, 345

[56] References Cited

U.S. PATENT DOCUMENTS

| | | | |
|---|---|---|---|
| 3,901,102 | 8/1975 | Manwaring | 403/359 |
| 3,972,491 | 8/1975 | Ferris et al. | 416/244 D |
| 4,175,913 | 11/1979 | Rybicki | 416/244 D |
| 4,209,266 | 6/1980 | Bowen et al. | 403/359 |

Primary Examiner—Edward K. Look
Assistant Examiner—Mark Sgantzos
Attorney, Agent, or Firm—Terrance J. Radke

[57] ABSTRACT

An integrated spline/cone seat subassembly for a rotor assembly that is design optimized to minimize the radial dimensions of the rotor shafts, the rotor shaft bearings, the transmission housing, and the swashplate subassemblies thereof. The integrated subassembly includes a rotor hub having a shaft aperture with a plurality of hub splines extend radially inwardly therefrom. The lower portion of each hub spline has an outwardly tapered portion that makes a predetermined angle with respect to the hub centerline. The integrated subassembly further includes a rotor shaft having a primary shaft portion of a first diameter, an end shaft portion having an intermediate second diameter less than the first diameter, and a conic transition portion that makes a predetermined angle with respect to the rotor shaft axis. The end shaft portion has a plurality of shaft splines extending radially outwardly therefrom that defines a third diameter that is equal to the first diameter. The hub and shaft splines are sized to accommodate the torque required by the rotor assembly and interleaved to provide a rotational interlock between the rotor hub and rotor shaft. The tapered portions of the hub splines abuttingly engage and are mechanically supported by the conic transition portion of the rotor shaft. The first diameter of the rotor shaft defines the radial dimensions of the rotor shafts, the rotor shaft bearings, the transmission housing, and the swashplate subassemblies of the rotor assembly.

2 Claims, 14 Drawing Sheets

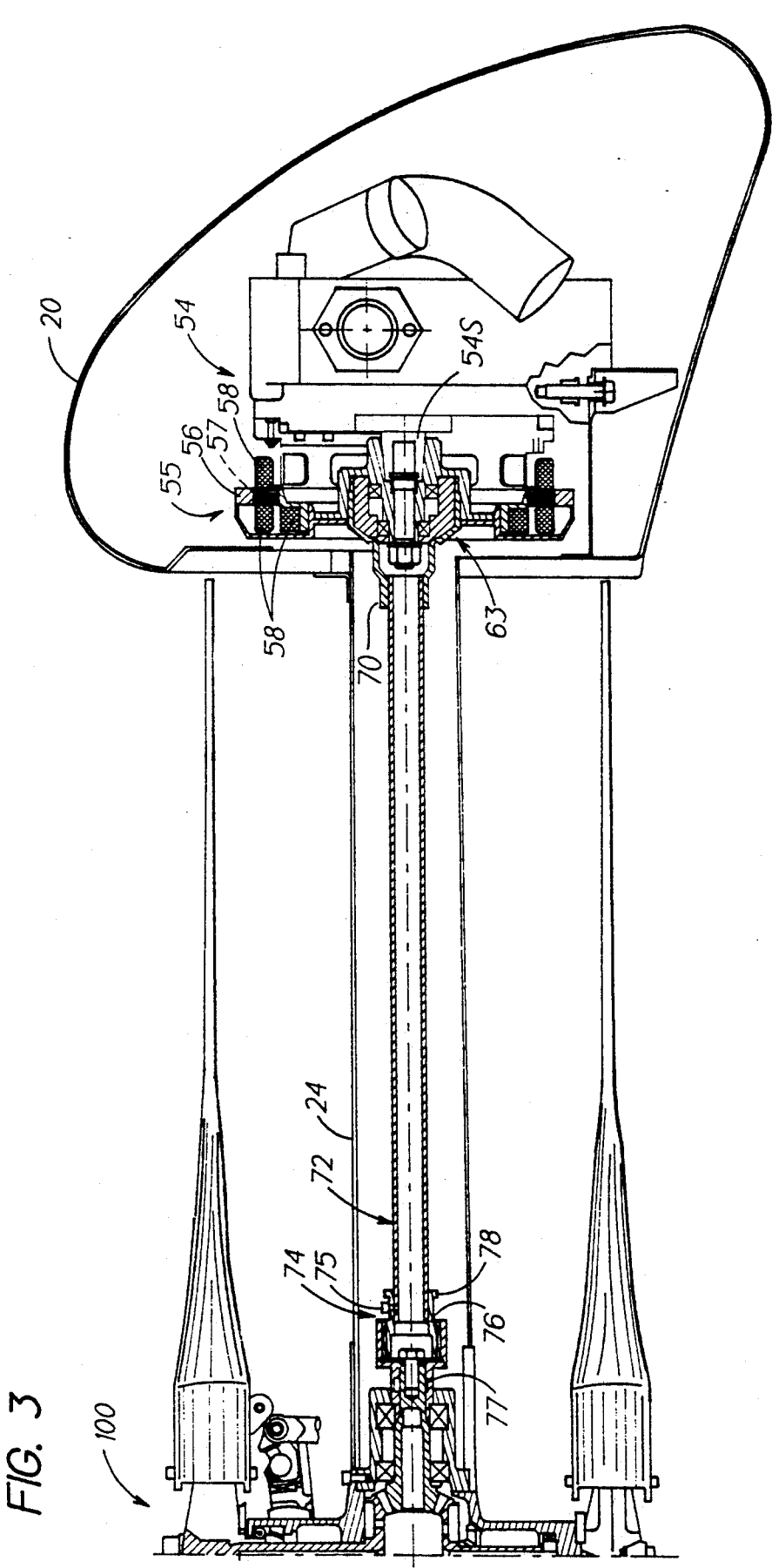

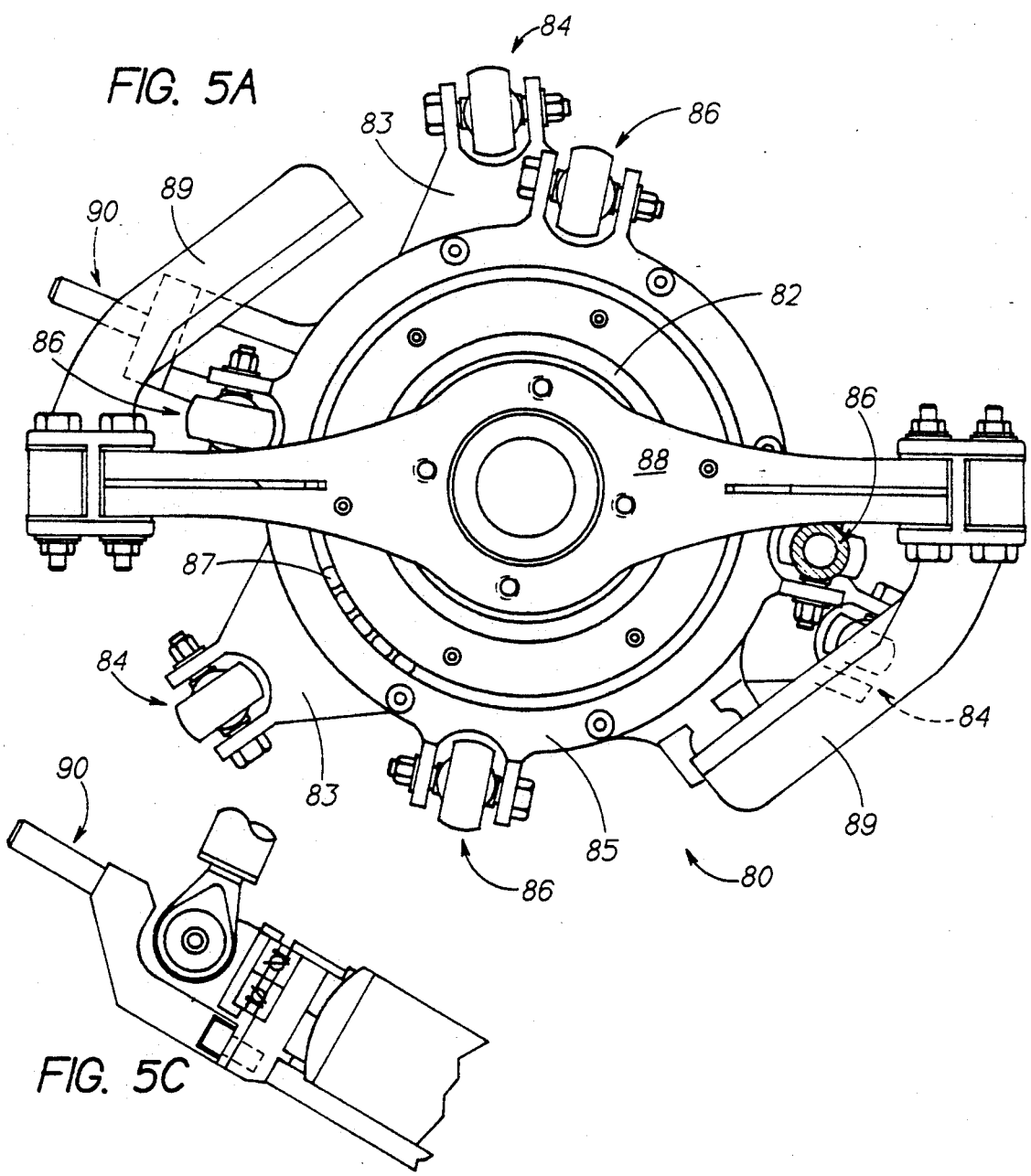
FIG. 5A
FIG. 5C
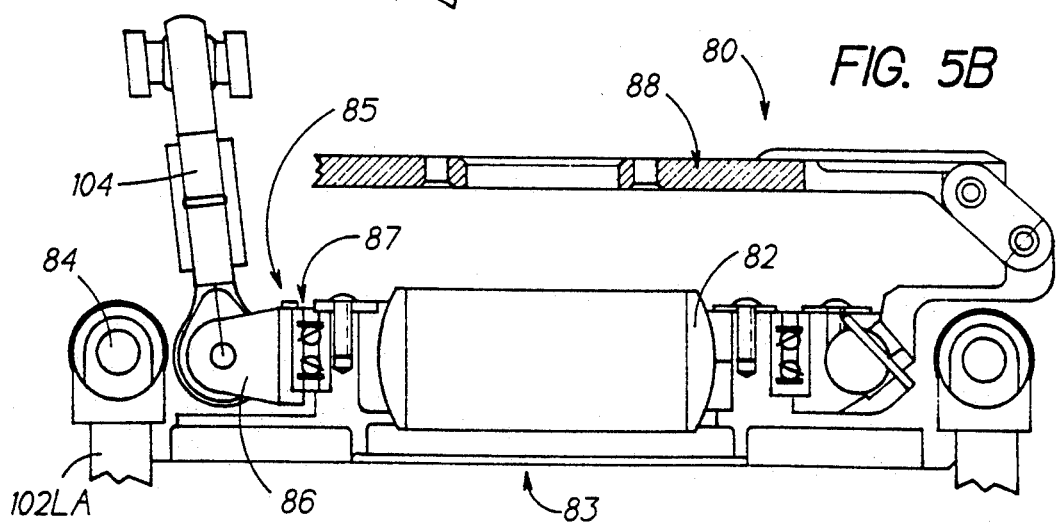
FIG. 5B

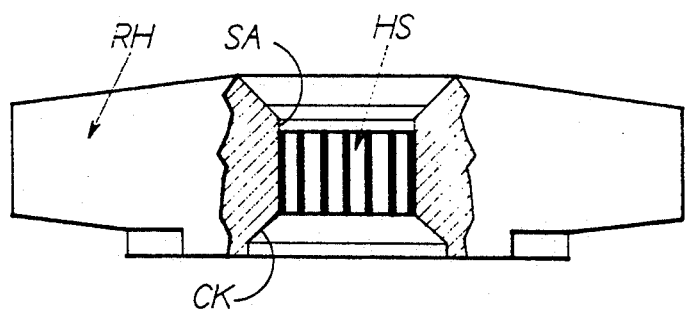
FIG. 8
PRIOR ART
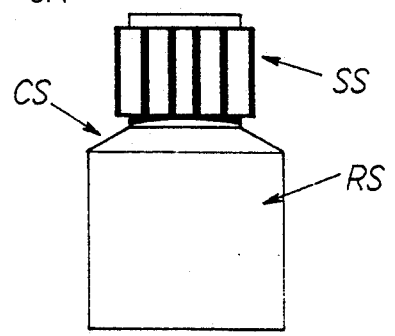
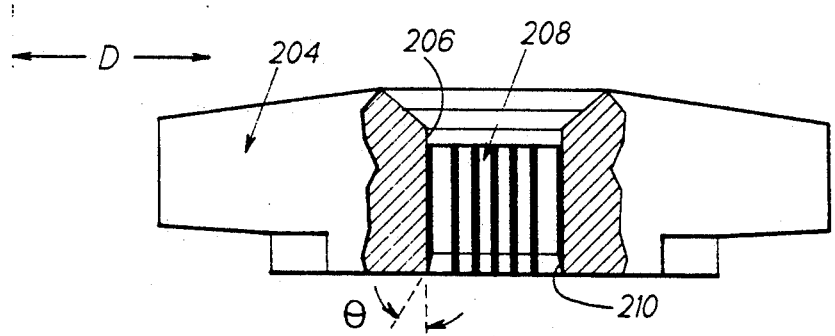
FIG. 9
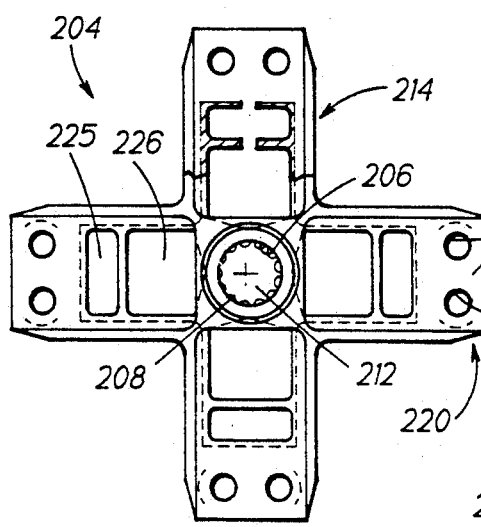
FIG. 9A
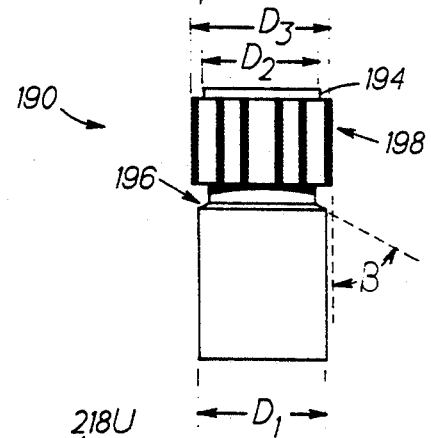
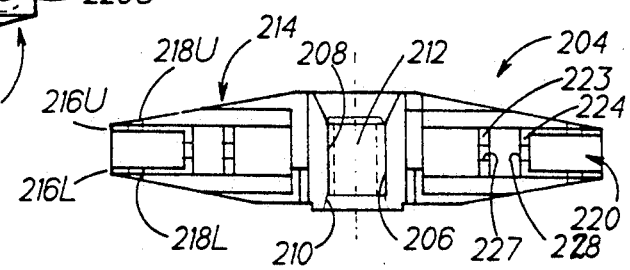
FIG. 9B

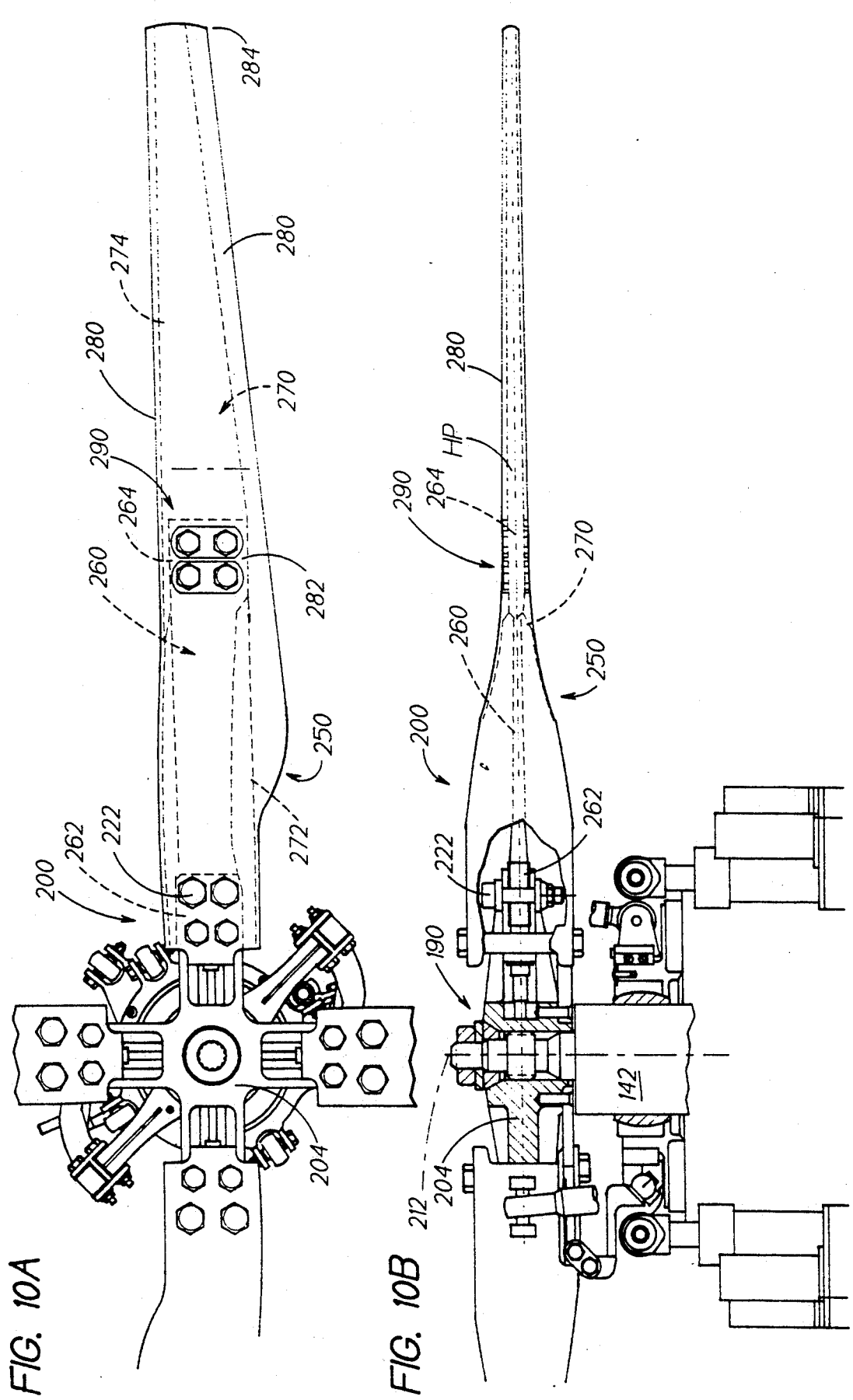

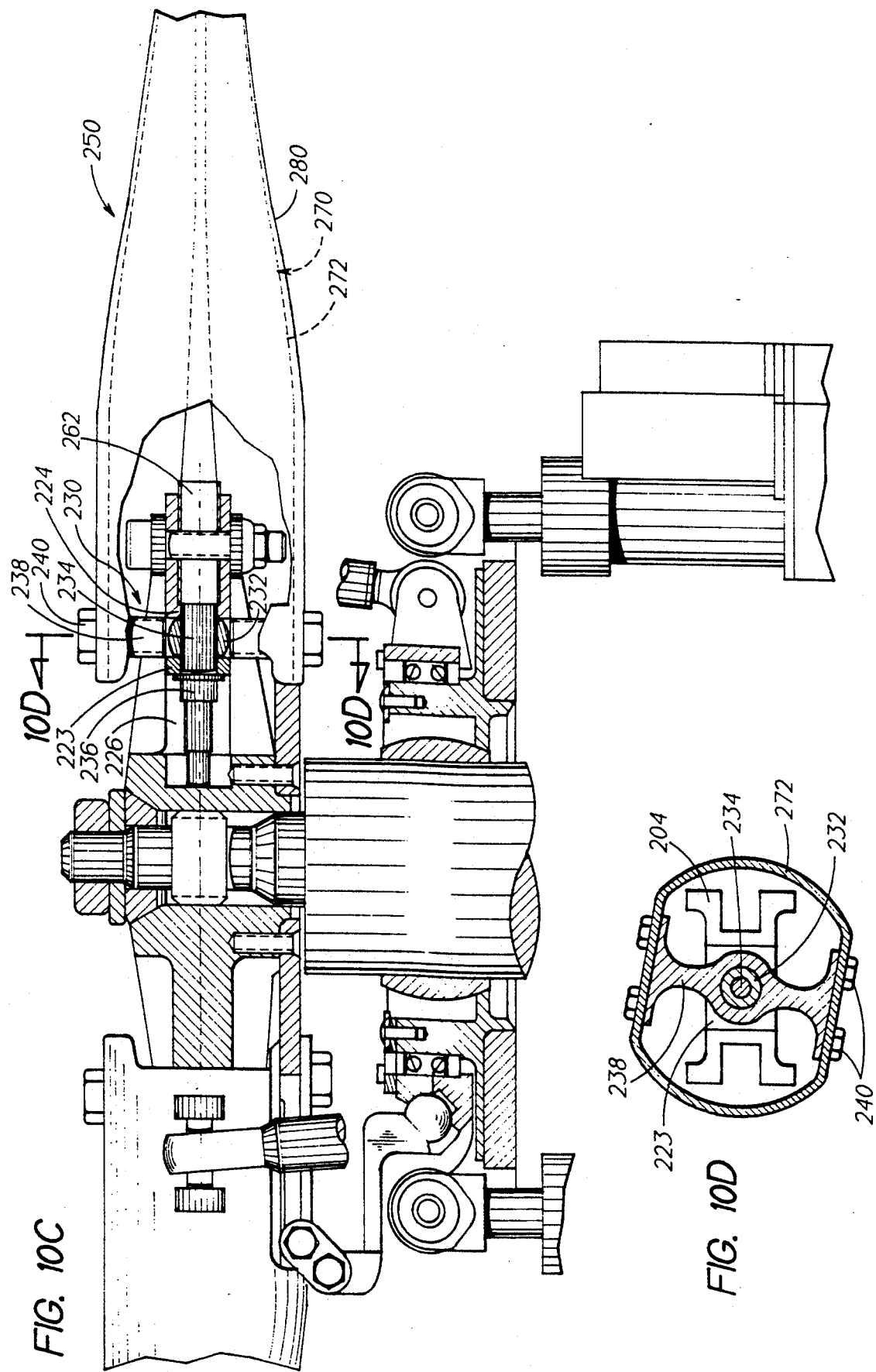

INTEGRATED SPLINE/CONE SEAT SUBASSEMBLY FOR A ROTOR ASSEMBLY HAVING DUCTED, COAXIAL COUNTER-ROTATING ROTORS

RELATED APPLICATION

The present application is related to commonly-owned, U.S. Pat. No. 5,150,857, entitled SHROUD GEOMETRY FOR UNMANNED AERIAL VEHICLES, to commonly-owned U.S. Pat. No. 5,152,478, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS, to commonly-owned, co-pending U.S. patent application Ser. No. 07/903,061, filed Jun. 22, 1992, entitled A ROTOR BLADE SUBASSEMBLY FOR A ROTOR ASSEMBLY HAVING DUCTED, COAXIAL COUNTER-ROTATING ROTORS, to commonly-owned, co-pending U.S. patent application Ser. No. 07/903,063, filed Jun. 22 1992, entitled A SNUBBER ASSEMBLY FOR A ROTOR ASSEMBLY HAVING DUCTED, COAXIAL COUNTER-ROTATING ROTORS, to commonly-owned, co-pending U.S. patent application Ser. No. 07/903,065, filed Jun. 22, 1992, entitled A COAXIAL TRANSMISSION/CENTER HUB SUBASSEMBLY FOR A ROTOR ASSEMBLY HAVING DUCTED, COAXIAL COUNTER-ROTATING ROTORS, to commonly-owned, co-pending U.S. patent application Ser. No. 07/903,066, filed Jun. 22, 1992, entitled A DRIVE TRAIN ASSEMBLY FOR A ROTOR ASSEMBLY HAVING DUCTED, COAXIAL COUNTER-ROTATING ROTORS, and to commonly-owned, co-pending U.S. patent application Ser. No. 07/903,060, filed Jun. 22, 1992, entitled TORODIAL AIRFRAME STRUCTURE FOR SHROUDED ROTOR UNMANNED AERIAL VEHICLES.

TECHNICAL FIELD

The present invention relates to unmanned aerial vehicles (UAVs), and more particularly, to an optimized integrated spline/cone seat subassembly for a rotor assembly for a UAV having a toroidal fuselage (shroud) and a pair of coaxial, counter-rotating, ducted, multi-bladed rotors.

BACKGROUND OF THE INVENTION

There has been a recent resurgence in the interest in unmanned aerial vehicles (UAVs) for performing a variety of missions where the use of manned flight vehicles is not deemed appropriate, for whatever reason. Such missions include surveillance, reconnaissance, target acquisition and/or designation, data acquisition, communications datalinking, decoy, jamming, harassment, or one-way supply flights. This interest has focused mainly on UAVs having the archetypical airplane configuration, i.e., a fuselage, wings having horizontally mounted engines for translational flight, and an empennage, as opposed to "rotor-type" UAVs, for several reasons.

First, the design, fabrication, and operation of "winged" UAVs is but an extrapolation of the manned vehicle flight art, and therefore, may be accomplished in a relatively straightforward and cost effective manner. In particular, the aerodynamic characteristics of such UAVs are well documented such that the pilotage (flight operation) of such vehicles, whether by remote communications datalinking of commands to the UAV and/or software programming of an on-board flight computer, is relatively simple.

In addition, the range and speed of such UAVs is generally superior to rotor-type UAVs. Moreover, the weight-carrying capacity of such UAVs is generally greater that rotor-type UAVs such that winged UAVs may carry a larger mission payload and/or a larger fuel supply, thereby increasing the vehicle's mission efficiency. These characteristics make winged UAVs more suitable than rotor-type UAVs for certain mission profiles involving endurance, distance, and load capability. Winged UAVs, however, have one glaring deficiency that severely limits their utility.

More specifically, winged UAVs do not have a fixed spatial point "loiter" capability. For optimal performance of many of the typical mission profiles described hereinabove, it is desirable that the UAV have the capability to maintain a fixed spatial frame of reference with respect to static ground points for extended periods of time, e.g., target acquisition. One skilled in the art will appreciate that the flight characteristics of winged UAVs are such that winged UAVs cannot maintain a fixed spatial frame of reference with respect to static ground points, i.e., loiter. Therefore, mission equipment for winged UAVs must include complex, sensitive, and costly motion-compensating means to suitably perform such mission profiles, i.e., maintenance of a constant viewing azimuth for a static ground points.

Rotor-type UAVs, in contrast, are aerodynamically suited for such loiter-type mission profiles. The rotors of the main rotor assembly of such UAVs may be operated so that the UAV hovers at a fixed spatial frame of reference with respect to static ground points.

A need exists for rotary-type UAVs for a wide variety of reconnaissance and/or communication missions, especially tactical reconnaissance missions. Such UAVs may include a rotor assembly having ducted, coaxial counter-rotating rotors. The rotor assembly should be design optimized to provide a UAV airframe structure that is structurally and aerodynamically compact and lightweight. The rotor assembly should be further design optimized to provide an optimal performance capability.

SUMMARY OF THE INVENTION

One object of the present invention is to provide an integrated spline/cone seat subassembly for a rotor assembly that is design optimized to minimize the radial dimensions of the rotor shafts, the rotor shaft bearings, the transmission housing, and the swashplate subassemblies of the rotor assembly.

Another object of the present invention is to provide an integrated spline/cone seat subassembly that includes a rotor hub having a shaft aperture with a plurality of hub splines extending radially inwardly therefrom, each hub spline having a tapered end portion that makes a predetermined angle with respect to the rotor hub centerline.

Yet another object of the present invention is to provide an integrated spline/cone seat subassembly that includes a rotor shaft having a primary shaft portion of first diameter, an end shaft portion of second diameter having a plurality of shaft splines extending radially outwardly therefrom, and a conic transition portion intermediate the primary and end shaft portions that makes a predetermined angle with respect to the rotor shaft axis.

Still another object of the present invention is to provide an integrated spline/cone seat subassembly wherein the predetermined angle of the outwardly tapered portion of the hub splines equals the predetermined angle of the conic transition portion of rotor shaft such that the tapered portions of the hub splines abuttingly engage and are mechanically supported by the conic transition portion of the rotor shaft.

A further object of the present invention is to provide an integrated spline/cone seat subassembly wherein the hub and shaft splines are sized to accommodate the torque required by the rotor assembly and interleaved to provide a rotational interlock between the rotor hub and the rotor shaft.

These and other objects are achieved by an integrated spline/cone seat subassembly according to the present invention that is design optimized for unmanned aerial vehicles (UAVs) having a rotor assembly with ducted, coaxial counter-rotating rotors. One embodiment of a UAV comprises a toroidal fuselage or shroud having an aerodynamic profile, flight/mission equipment, a powerplant subsystem, and a rotor assembly. The toroidal fuselage is fabricated from a composite material as a closed toroid to provide maximal structural strength. The toroidal fuselage has a plurality of support struts integrally formed with and extending radially outwardly from the inner periphery of the toroidal fuselage which are operative to support the rotor assembly in a fixed coaxial relation with respect to the toroidal fuselage. The toroidal fuselage is configured to provide a plurality of accessible internal bays.

Forward located internal bays are typically utilized for sundry flight/mission equipment. Distribution of the various flight/mission equipment is optimized in conjunction with the placement of the powerplant subsystem. The powerplant subsystem includes the fuel tank(s), an engine, and a drive train assembly. The fuel tanks and engine are disposed within appropriate internal bays. The embodiment of the UAV described herein utilizes a Norton Motors rotary engine, Model NR801T (modified as described hereinbelow), which provides a high power to weight ratio and good partial power fuel consumption. The NR801T engine is an air/liquid cooled engine that produces 45 HP at 6,000 RPM. Operation of the engine is controlled and monitored by the flight computer.

The standard Norton engine was modified by combining the functional features of the flywheel and the Plessey generator in an integrated flywheel/generator subassembly. The integrated flywheel/generator subassembly includes a large diameter, thin rotor having a plurality of magnets internally mounted therein, and a plurality of rigidly mounted stators. The drive train assembly of the described embodiment includes a sprag clutch, an engine coupling subassembly, a drive shaft, and a transmission coupling subassembly. The drive train assembly is operative to transfer the power developed by the engine to the rotor assembly.

The rotor assembly comprises an electronic control servo subsystem, upper and lower stationary swashplate subassemblies, a plurality of pitch control rods, a coaxial transmission/center hub subassembly, upper and lower integrated spline/cone seat subassemblies, and upper and lower multi-bladed, counter-rotating rotors integrated in combination with the transmission/center hub subassembly. The rotors are aerodynamically "shrouded" by the toroidal fuselage. Blade pitch changes induced in the counter-rotating rotors are utilized to generate all required lift, pitch, roll, and yaw control of the UAV. Such pitch changes are also utilized to regulate the pattern and velocity of airflow over the toroidal shroud and into the rotor assembly. Such control of the airflow creates a lifting component on the toroidal shroud that augments the lift provided by the counter-rotating rotors.

The electronic control servo subsystem is operative to control the functioning of the upper and lower stationary swashplate subassemblies by coupling inputs from the flight computer to the respective swashplate subassemblies. The upper and lower stationary swashplate subassemblies are operative, in response to mechanical inputs from the linear actuators of the electronic control servo subsystem, to selectively mechanically couple cyclic pitch inputs and/or collective pitch inputs to the respective counter-rotating rotors by means of the pitch control rods, which are mechanically secured at the ends thereof to the swashplate subassemblies and rotor blade assemblies of the counter-rotating rotors. The swashplate subassembly is design optimized for effective utilization in combination with the configuration of the coaxial transmission/center hub subassembly.

The configuration of the transmission/center hub subassembly is design optimized to provide an integrated, low component part system that is lightweight, compact, and structurally and thermally efficient. The transmission/center hub subassembly includes a single stage transmission subsystem, a multi-member transmission housing, and a center hub support structure. The configuration of the transmission/center hub subassembly provides enhanced power transfer efficiency between the powerplant subsystem and the counter-rotating rotors, thereby increasing the operational capability and efficacy of the UAV. Further, the transmission/center hub subassembly configuration minimizes the separation between the upper and lower counter-rotating rotors, thereby providing a UAV having a compact structural and aerodynamic envelope. The configuration of the transmission/center hub subassembly also facilitates the transfer of the dynamic loads developed by the counter-rotating rotors, and reduces airframe vibration levels by providing a direct load path between the upper and lower counter-rotating rotors so that canceling of bending moments produced by the rotors during flight operations occurs.

The single stage transmission subsystem comprises an input pinion gear, bearings for mounting the input pinion gear in rotatable combination with the transmission housing, and upper and lower spiral bevel gears. The upper and lower spiral bevel gears have upper and lower rotor shafts, respectively, integrally formed therewith, thereby eliminating the need for separate rotor shaft connection means. The transmission subsystem further includes standpipe bearings for rotatably mounting the respective upper and lower rotor shafts in combination with the transmission housing.

The input pinion gear is mechanically coupled to the drive shaft and operative to transmit torque from the engine to the upper and lower spiral bevel gears. The placement of the bevel gears vis-a-vis the input pinion gear causes counter rotation of the upper and lower rotor shafts with respect to one another.

The multi-member transmission housing includes an upper standpipe housing, a lower standpipe housing, and a middle housing. The upper and lower standpipe housings are secured in combination with the middle housing to provide direct load paths for the dynamic and static longitudinal, lateral, vertical, and torsional loads developed by the upper and lower counter-rotating rotors into the middle housing. This functional feature allows the operating moments of the upper and lower rotors to cancel each other out in the middle housing. The cancellation function provided by the configuration of the transmission housing significantly reduces vibratory loads that would normally be transmitted to the toroidal fuselage.

The coaxial transmission/center hub subassembly utilizes the external surfaces of the upper and lower standpipe housings as sliding surfaces for the bidirectional translational movement of the respective stationary swashplate subassemblies. By utilizing the external surfaces for swashplate motion, a minimum separation between the upper and lower counter-rotating rotors is achieved, thus providing the UAV with a compact structural and aerodynamic envelope.

The described embodiment of the coaxial transmission/center hub subassembly includes a separate center hub support structure having a cylindrical body with three support arms extending radially outwardly therefrom. The support arms function as the rigid attachment points for the support struts to mount the coaxial transmission/center hub subassembly in fixed coaxial relation to the toroidal fuselage.

The center hub support structure is configured so that the middle housing of the multi-member transmission housing may be slidably inserted therein such that external surfaces of the middle housing abuttingly engage internal surfaces of the center hub support structure. The abuttingly engaged surfaces in combination function as mounting and load bearing surfaces that are operative to transfer the dynamic and static loads developed by the counter-rotating rotors to the center hub support structure. The dynamic and static rotor loads and the thermal loads coupled into the center hub support structure are transmitted into the toroidal fuselage, via the support struts, by means of the integral support arms. Cooling of the coaxial transmission/center hub subassembly, and in particular the middle housing, is facilitated by the structural arrangement wherein the center hub support structure, the support arms, and the support struts lie directly in the downwash generated by the upper rotor, thereby facilitating convective cooling of such structural elements.

The coaxial transmission/center hub subassembly further includes a splash lubrication subsystem that provides oil lubrication for the input pinion gear, the transmission bearings, the upper and lower spiral bevel gears, and the standpipe bearings. Oil is circulated, due to the rotary motion of the upper and lower spiral bevel gears, throughout the fluid flow pathways of the splash lubrication subsystem to lubricate the aforedescribed components.

The upper and lower integrated spline/cone seat subassemblies are operative to secure the upper and lower counter-rotating rotors, respectively, in combination with the coaxial transmission/center hub subassembly. The integrated spline/cone seat subassembly is design optimized to reduce the size/radial dimensions of the upper and lower rotor shafts, the standpipe bearings, the standpipe housings, and the upper and lower stationary swashplate subassemblies. The downsizing of these components provides a significant savings in the overall system weight of the UAV.

The integrated spline/cone seat subassembly includes a primary shaft portion having a first diameter, an end shaft portion having a second diameter (the first diameter being greater than the second diameter), and a truncated conic transition portion intermediate the primary, end shaft portions. The truncated portion makes a predetermined angle with respect to the axis of the respective rotor shaft. Each end shaft portion has a plurality of shaft splines extending radially outwardly therefrom. The diameter defined by the outboard, circumferential surfaces of the shaft splines is equal to the first diameter of the primary shaft portion.

Each counter-rotating rotor includes a rotor hub that functions as part of the respective integrated spline/cone seat subassembly. Each rotor hub includes a shaft aperture having a plurality of hub splines extending radially inwardly from the wall defining the shaft aperture. The hub splines and the shaft splines are sized to accommodate the torque required by the counter-rotating rotors. The specific number and individual thicknesses of the hub splines complement the specific number and individual thicknesses of the shaft splines so that the interleaved hub and shaft splines are operative to provide a rotational interlock between each rotor hub and the corresponding rotor shaft.

The lower portion of each hub spline has an outwardly tapered portion that makes a predetermined angle with respect to the hub centerline. The predetermined angle of the outwardly tapered portions of the hub splines is equal to the predetermined angle of the truncated portion. The tapered portions of the hub splines abuttingly engage and are mechanically supported by the truncated conic transition portion of the respective rotor shafts. Self-locking nuts are threaded onto the ends of the respective rotor shafts to secure the rotor hubs in interlocked, engaged combination with the respective rotor shafts.

The first diameter of the primary shaft portion of the respective rotor shafts defines the radial dimensions of the respective rotor shafts, and, in consequence, the sizing of the standpipe bearings, the multi-member transmission housing, and the stationary swashplate subassemblies.

Each counter-rotating rotor includes the rotor hub, four snubber assemblies, and four rotor blade assemblies. The rotor hub additionally comprises four outwardly extending arms having ends forming a clevis. Each clevis provides the means for securing the rotor blade assembly in combination with the rotor hub. The rotor hub also functions as an element of the snubber assembly. Each outwardly extending arm is further configured to provide the means for securing the respective snubber assembly in combination with the rotor hub.

The snubber assembly comprises a spherical bearing, a bearing bolt, a locking nut, a snubber bracket secured in combination with the spherical bearing, and securing bolts. The spherical bearing, snubber bracket combination is rotatably mounted within the rotor hub by means of the bearing bolt and secured in combination with the rotor hub by means of the locking nut.

Each counter-rotating rotor includes four rotor blade assemblies. Each rotor blade assembly comprises an inner flexbeam, an integrated torque tube/spar member, an outer aerodynamic fairing or rotor blade, and an optimized blade joint, and an optimized pitch control rod mounting scheme. Each rotor blade assembly has a tapered configuration that provides reduced weight, low inertia, a high chord frequency, an improved aerodynamic profile, low static droop, and eliminates high chordwise stresses and the need for blade damping mechanisms.

The flexbeam is a laminated composite structure that is operative to react the centrifugal loads and a majority of the bending loads developed during operation of the counter-rotating rotors. The flexbeam is secured in combination to the rotor hub and the respective integrated torque tube/spar member and tapered rotor blade. To compensate for the variable strains induced along the span of the flexbeam, the flexbeam has a predetermined linear twist, i.e., built-in twist, along the span thereof (inboard end to outboard end). As a result of such pretwisting, the pretwisted flexbeam makes an angle with respect to a horizontal plane that varies linearly from about 0° at the inboard end (root section) of the pretwisted flexbeam to about 22° at the outboard end (tip section) of the pretwisted flexbeam.

The integrated torque tube/spar member is formed as a continuous, single piece, low cost tubular composite structure that provides high torsional and bending stiffness and facilitates the utilization of the efficient blade joint. The integrated torque tube/spar structure is formed as a continuous filament wound piece that provides a continuous torsion load path and facilitates load coupling from the tapered rotor blades into the respective pretwisted flexbeam. The integrated torque tube/spar member includes an inboard torque tube segment and a outboard spar segment. The spar segment functions as the primary structural member of the rotor blade subassembly and is operative to react all bending, torsional, shear, and centrifugal dynamic loads developed during operation of the counter-rotating rotors. The torque tube segment is operative to react all torsional loads and some of the bending loads developed during operation of the counter-rotating rotors.

The configuration of the rotor blade of each rotor blade subassembly is design optimized for reduced weight utilizing composite materials, e.g., high modulus graphite, which results in a tapered rotor blade having a high chordwise frequency. Each outboard segment of the rotor blades is configured to have an aerodynamic taper of about 2:1, which results in a tapered rotor blade having a low outboard mass and a high inboard stiffness. The aerodynamic taper of the outer rotor blades results in a low moment of inertia about the hub centerline and the mass centroid of each rotor blade being closer to the rotor hub. The high chordwise frequency of the tapered rotor blades provides the benefit of rotor operation over a weaker modal response zone.

The optimized blade joint is operative to secure the pretwisted flexbeam in combination with the respective integrated torque tube/spar member and tapered rotor blade. The blade joint includes an innovative bolt layout that is optimally positioned to eliminate the moment reaction at the blade joint due to the steady chordwise loading experienced by the rotor blade assembly, thereby allowing the utilization of smaller bolts and reduced joint thicknesses. The rotor blade subassembly further includes an optimized pitch control rod mounting scheme that results in the pressure forces acting on the strongest part of the control rod bearing such that longer effective lifetimes are achieved for the control rod bearings.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 3 is a cross-sectional view illustrating a drive train assembly for the UAV according to the present invention.

FIG. 5A is a top plan view of one preferred embodiment of a swashplate subassembly for the rotor assembly of FIG. 4.

FIG. 5B is a side plan view of the swashplate subassembly of FIG. 5A.

FIG. 5C is a side view of a stationary mechanical scissor.

FIG. 8 is a schematic representation of a prior art spline/cone seat arrangement for a rotor assembly.

FIG. 9 is a schematic representation of an integrated spline/cone seat subassembly for the rotor assembly according to the present invention.

FIG. 9A is a top plan view of the rotor hub of the integrated spline/cone seat subassembly according to the present invention.

FIG. 9B is a cross-sectional view of the rotor hub of FIG. 9A.

FIG. 10A is a top plan view of the top rotor assembly for the UAV of the present invention.

FIG. 10B is a partially broken away side plan view of the rotor assembly of FIG. 10A.

FIG. 10C is a partial, enlarged view of FIG. 10B illustrating the snubber assembly of the present invention.

FIG. 10D is a cross-sectional view of the snubber assembly taken along line 10D—10D of FIG. 10C.

DETAILED DESCRIPTION OF PREFERRED EMBODIMENTS

Figure 1:
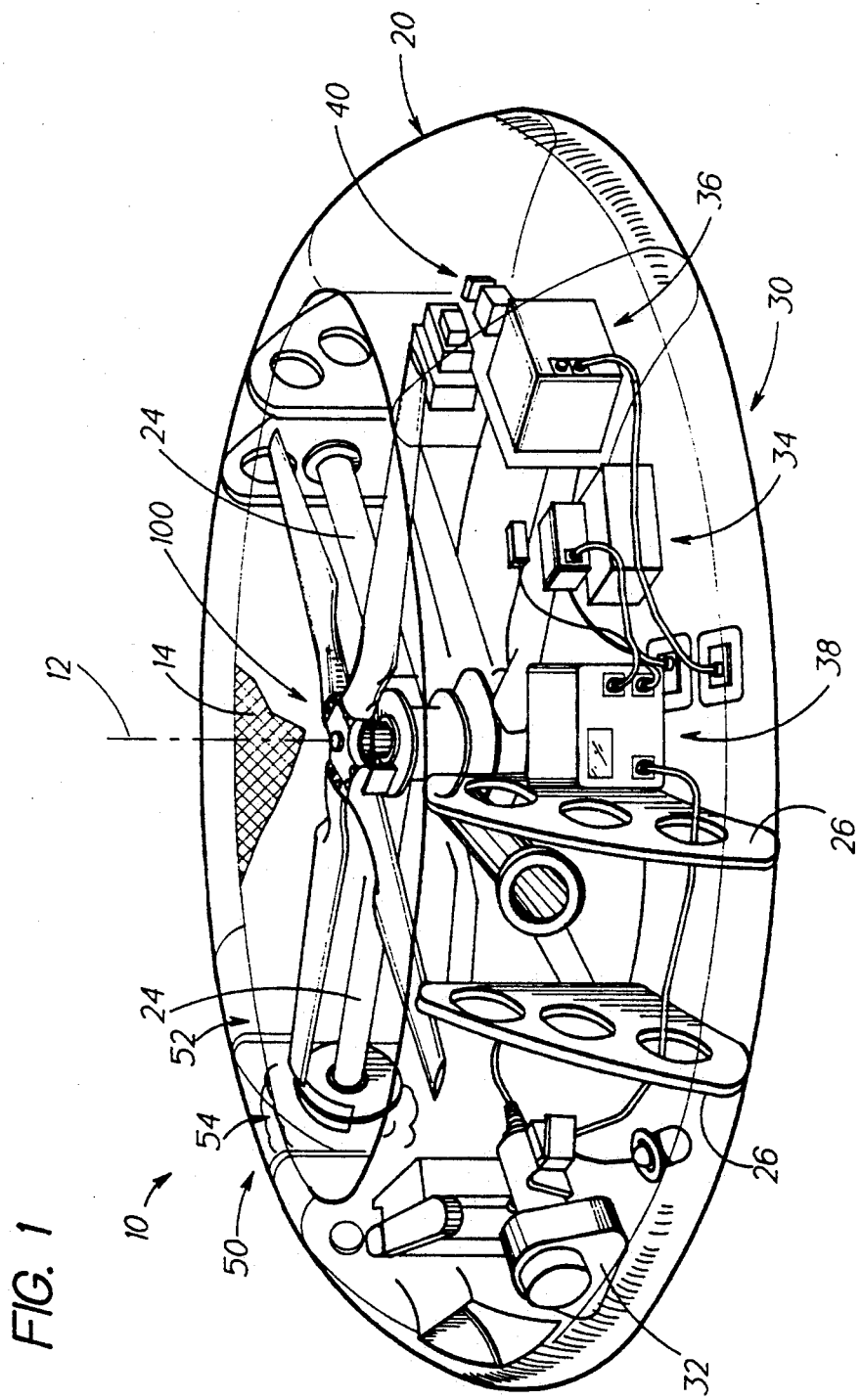
FIG. 1 is a perspective, partially broken away view of one embodiment of an unmanned aerial vehicle (UAV) according to the present invention.
Figure 2:
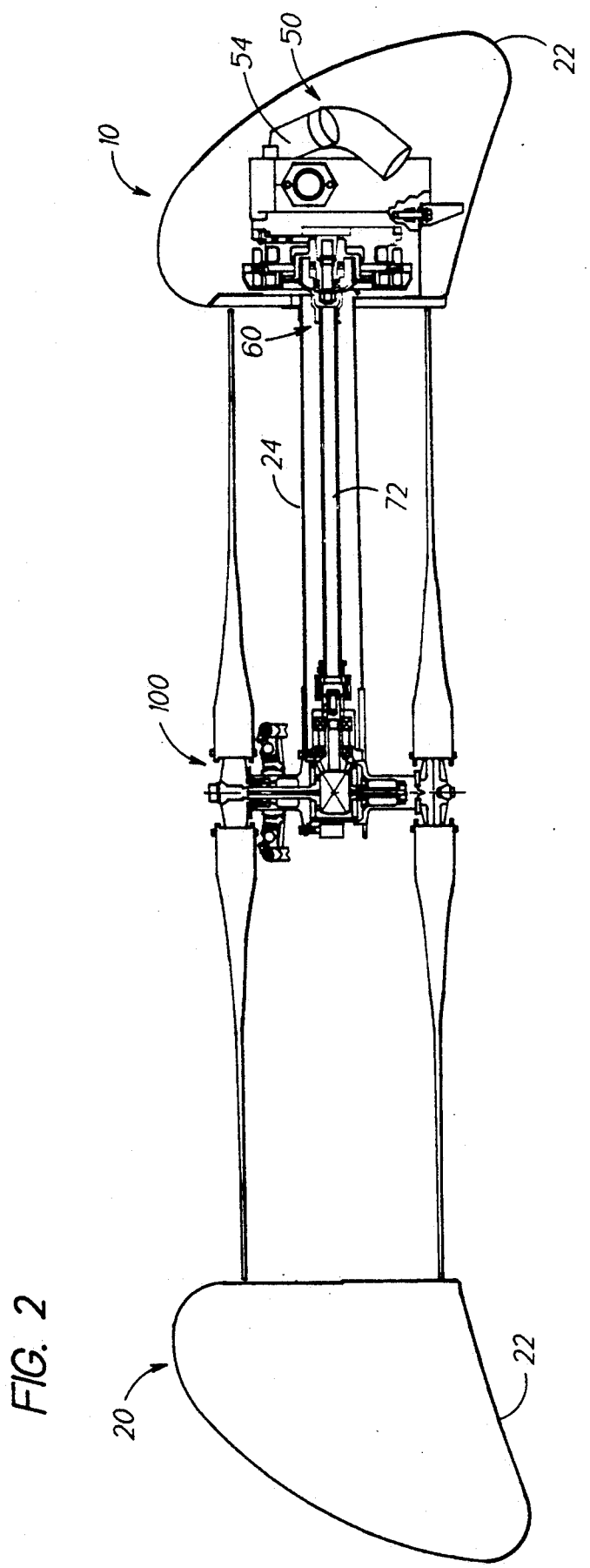
FIG. 2 is a cross-sectional view illustrating a preferred aerodynamic profile for the toroidal fuselage of the UAV of FIG. 1.

Referring now to the drawings wherein like reference numerals identify corresponding or similar elements throughout the several views, FIGS. 1 and 2 illustrate one embodiment of an unmanned aerial vehicle (UAV) 10 according to the present invention. The illustrated embodiment of the UAV 10 comprises a toroidal fuselage or shroud 20 having an aerodynamic profile 22, flight/mission equipment 30, a powerplant subsystem 50, and a rotor assembly 100. The aerodynamic profile 22 of the toroidal fuselage 20 of the described embodiment may be optimized to minimize nose-up pitching moments during forward translational flight. One preferred aerodynamic profile 22 for the illustrated UAV 10 is described in further detail in commonly-owned U.S. Pat. No. 5,150,857, entitled SHROUD GEOMETRY FOR UNMANNED AERIAL VEHICLES, which is incorporated herein by reference. Another embodiment of the UAV 10 according to the present invention, which includes a toroidal fuselage or shroud having a hemicylindrical aerodynamic profile, is described in commonly-owned, U.S. Pat. No. 5,152,478, entitled AN UNMANNED FLIGHT VEHICLE INCLUDING COUNTER ROTATING ROTORS POSITIONED WITHIN A TOROIDAL SHROUD AND OPERABLE TO PROVIDE ALL REQUIRED VEHICLE FLIGHT CONTROLS. This embodiment utilizes cyclic pitch to compensate for the fuselage-induced nose-up pitching moments experienced during forward translational flight.

The embodiment of the UAV 10 described herein has a toroidal fuselage 20 diameter of about 6.5 feet, a toroidal fuselage 20 envelope height of about 1.6 feet, an empty vehicle weight of about 175 pounds, and a gross vehicle weight of about 250 pounds. Reference numeral 12 illustrated in FIG. 1 defines the fuselage axis of the UAV 10. The toroidal fuselage 20 has a plurality of support struts 24 (three for the described embodiment) integrally formed with and extending radially outwardly from the inner periphery of the toroidal fuselage 20 to the rotor assembly 100. The support struts 24, which are rigidly attached to the rotor assembly 100 as described hereinbelow in further detail, are operative to support the rotor assembly 100 in a fixed coaxial relation with respect to the toroidal fuselage 20, i.e., the rotational axis of the rotor assembly 100 coincides with the fuselage axis 12. The support struts 24 are hollow structures to minimize the overall weight of the UAV 10, and to provide conduits for interconnecting operating elements of the UAV 10. For example, the engine drive shaft (see description hereinbelow) is routed through one of the support struts 24, as illustrated in FIG. 2. In addition, the electrical interface wiring for the electronic control servo subsystem (see description hereinbelow) is routed through another support strut 24.

The toroidal fuselage 20 and the plurality of support struts 24 are preferably fabricated from composite material to provide a high strength structure of minimal weight. The various types of high tensile strength fibrous materials and resins having utility in the formation of aerospace composite structures are well known to those skilled in the art. The toroidal fuselage 20 is fabricated as a closed toroid to provide maximal structural strength. The toroidal fuselage 20 is a partially hollow structure, and fabricated so as to provide a plurality of accessible internal bays 26. One preferred embodiment of the toroidal fuselage 20 of the UAV 10 described herein is disclosed in further detail in commonly-owned, co-pending U.S. patent application Ser. No. 07/903,060, filed Jun. 22 1992, entitled TOROIDAL AIRFRAME STRUCTURE FOR SHROUDED ROTOR UNMANNED AERIAL VEHICLES, which is incorporated herein by reference.

Forward located internal bays 26 are typically utilized for sundry flight/mission equipment 30 as described hereinbelow. The mission payload equipment 32 is preferably located, but not limited to, the internal bay 26 at the 180° azimuthal station (the forward station). Generally, the mission payload equipment 32 will consist of some type of passive sensor(s), e.g., infrared detector(s), television camera(s), etc., and/or active device(s), e.g., laser(s), radio communications gear, radar, etc., and the associated processing equipment, and the forward internal bay 26 provides a good field-of-view for such mission payload equipment 32. Other flight/mission equipment 30 such as avionics 34, navigation equipment 36, flight computer 38, communications gear 40 (for relaying real time sensor data and receiving real time command input signals), antennae, etc., are distributed in the various internal bays 26 as exemplarily illustrated in FIG. 1. Distribution of the various flight/mission equipment 30 is optimized in conjunction with the placement of the powerplant subsystem 50 as described hereinbelow.

The powerplant subsystem 50 includes the fuel tank(s) 52, an engine 54, and a drive train assembly 60. The fuel tanks 52 are disposed within appropriate internal bays 26, preferably in opposed equipment bays 26 at the 90°, 270° azimuthal stations (the lateral stations) to maintain a constant center of gravity for the UAV 10 during flight operations. The engine 54 is mounted within an internal bay 26. The positioning of the engine 54 is selected to counterbalance the weight of the flight/mission equipment 30, which is disposed in the opposite portion of the toroidal fuselage 20 as described hereinabove. The embodiment of the UAV 10 described herein utilizes a Norton Motors rotary engine, Model NR801T (modified as described hereinbelow), which provides a high power to weight ratio and good partial power fuel consumption. The NR801T engine is an air/liquid cooled engine that produces 45 HP at 6,000 RPM. Operation of the engine 54 is controlled and monitored by the flight computer 38.

The standard Norton engine described in the preceding paragraph was determined to be deficient in several respects for utilization in the embodiment of the UAV 10 described herein. The standard Norton engine includes a separate flywheel that is operative to store/release torque energy as required so that the Norton engine provides a relatively steady torque output. The standard Norton engine further includes a separate Plessey generator that is driven by the engine to provide electrical power. The Plessey generator of the standard Norton engine is a heavy device having outsized dimensions.

As a result of these features and characteristics of the standard Norton engine, the overall dimensional envelope of the standard Norton engine was not compatible with the structural contours of the toroidal fuselage described hereinabove (see also commonly-owned, copending U.S patent application Ser. No. 07/903,060, filed Jun. 22, 1992, entitled TOROIDAL AIRFRAME STRUCTURE FOR SHROUDED ROTOR UNMANNED AERIAL VEHICLES. More specifically, the standard Norton engine could not be mounted within the internal bays 26 defined by the toroidal fuselage 20. Furthermore, the weight of the standard Norton engine would have significantly increased the overall gross weight of the UAV. The weight of the standard Norton engine would have also resulted in an outboard shift in the center of gravity of the UAV, which would have presented weight and balance distribution problems with the flight/mission equipment 30.

The standard Norton engine was modified by combining the functional features of the flywheel and the Plessey generator in an integrated flywheel/generator subassembly 55 as illustrated in FIG. 3 The integrated flywheel/generator subassembly 55 is operative to store/release torque energy as required so that the modified Norton engine 54 provides a relatively steady torque output while concomitantly providing electrical power. The integrated flywheel/generator subassembly 55 includes a large diameter, thin rotor 56 having a plurality of magnets 57 internally mounted therein, and a plurality of rigidly mounted stators 58. The rotor 56 is mechanically interconnected to the bundt pan of the drive train assembly (described hereinbelow in further detail) such that the modified Norton engine 54 provides the necessary torque for rotation of the rotor 56.

The integrated flywheel/generator subassembly 55 weighs less than the separate flywheel and Plessey generator of the standard Norton engine such that the overall gross weight of the UAV 10 is reduced. In addition, the dimensional envelope of the integrated flywheel/generator subassembly 55 permits the modified Norton engine 54 to be mounted within an internal bay 26 of the toroidal fuselage 20. Further, the dimensional envelope, relative positioning, and reduced weight of the integrated flywheel/generator subassembly 55 result in an inboard shift of the center of gravity of the modified Norton engine 54.

The drive train assembly 60 of the described embodiment of the UAV 10 includes an over-running clutch such as a Borg-Warner sprag clutch. Over-running clutches are included as functional elements of the drive trains of rotor assemblies to provide automatic decoupling between the drive shaft and the engine when the engine is shut down. Such decoupling permits the kinetic energy stored in the rotor assembly to be efficaciously and safely dissipated. Over-running clutches, however, do not function efficiently if subjected to over-hung loads, i.e., large operating moments and/or vibratory torque loads, such over-hung loads inducing misalignments between the inner and outer races of the clutch housings. To ensure effective functioning of over-running clutches, vibratory torque coupled into the over-running clutch and/or operating moments coupled through the over-running clutch bearings should be minimized.

The Norton engine 54 utilized in the described embodiment of the UAV 10 produces a torque signature similar to a two-cycle internal combustion engine. Measurements taken during operation of such an engine revealed large torque irregularities of up to eight times the magnitude of the steady state torque produced by the engine 54. Such torque irregularities adversely affect the functional capabilities of over-running clutches as described in the preceding paragraph.

Furthermore, the Norton engine 54 is mounted on soft shock absorbers (not illustrated) to attenuate engine loads and moments generated during operation of the engine 54. Operation of the engine 54 (as well as the rotor assembly 100) can induce misalignments in the drive train drive shaft.

Figure 3A:
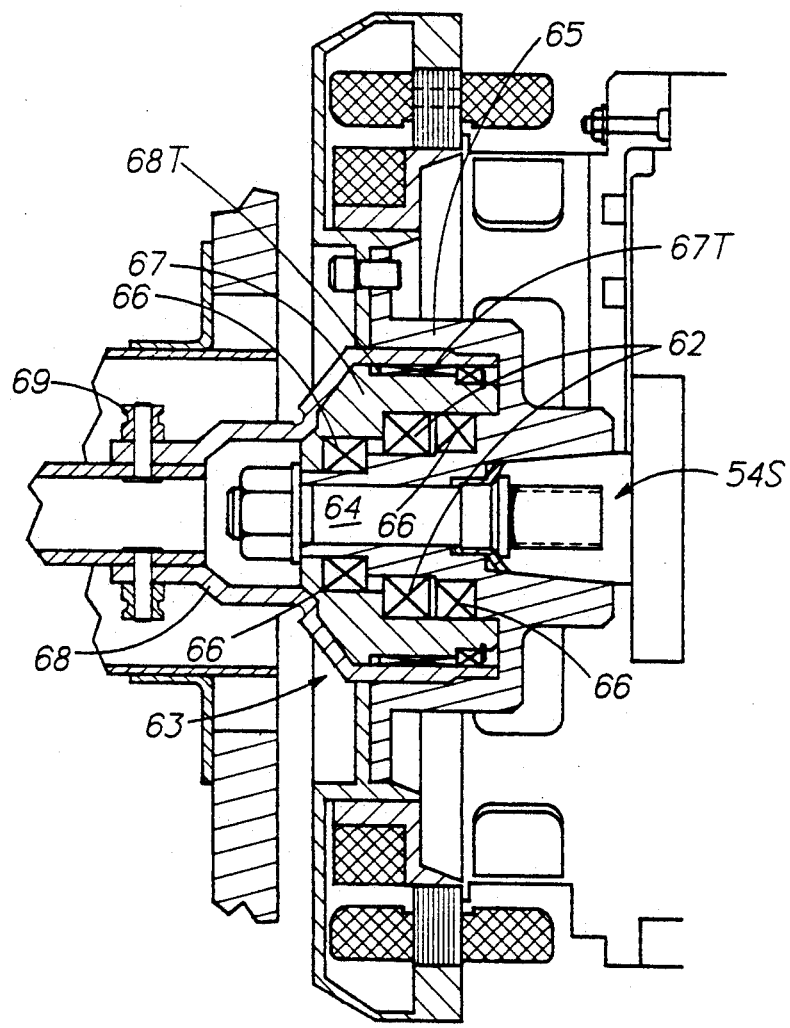
FIG. 3A is an expanded cross-sectional view of one portion of the drive train assembly of FIG. 3.

One preferred embodiment of the drive train assembly 60 for the embodiment of the UAV 10 described herein is illustrated in FIGS. 3, 3A and includes a sprag clutch 62, an engine coupling subassembly 63, a drive shaft 72, and a transmission coupling subassembly 74. The drive train assembly 60 is operative to transfer the power developed by the engine 54 to the rotor assembly 100. The configuration of the drive train assembly 60 of the present invention is design optimized to maximize the functional capability of the sprag clutch 62, i.e., minimize/eliminate loads and/or moments that degrade clutch performance, and to accommodate maximum axial, angular, and parallel misalignment between the engine 54 and the rotor assembly 100. In addition, the configuration of the drive train assembly 60 is operative to effectuate cancellation of loads developed by the integrated flywheel/generator subassembly 55 of the engine 54 described hereinabove.

With reference to FIGS. 3, 3A, the engine coupling subassembly 63 includes a stud 64, a tapered adaptor or bundt pan 65, ball bearings 66, an external crown spline coupling 67, an internal spline coupling 68, and a pin-collar connector 69. The stud 64 provides a hard mount between the engine coupling subassembly 63 and the tapered output shaft 54S of the engine 54. The stud 64 is mechanically interconnected to the bundt pan 65. The sprag clutch 62 is rigidly centered intermediate the external crown spline coupling 67 and the bundt pan 65 by means of the ball bearings 66. The external crown spline coupling 67 is mechanically interconnected (via complementary spline teeth 67T, 68T as illustrated in FIG. 3A) to the internal spline coupling 68.

One end of the drive shaft 72 is mechanically coupled to the engine coupling subassembly 63 (more specifically the internal spline coupling 68) by means of the pin-collar connector 69. The other end of the drive shaft 72 is mechanically coupled to the transmission coupling subassembly 74 by means of a pin-collar connector 75. The transmission coupling subassembly 74 includes, in addition to the pin-collar connector 75, an external crown spline coupling 76 and a gear spline coupling 77. The external crown spline coupling 76 is mechanically coupled (via complementary spline teeth) to the gear spline coupling 77. The gear spline coupling 77 is configured for mechanical interconnection with the rotor assembly 100 as described in further detail hereinbelow.

The internal spline coupling 68 and the external crown spline coupling 76 include additional material masses 70, 78 as illustrated in FIG. 3. These material masses 70, 78 are machined as required to facilitate balancing of the drive shaft 72.

Torque from the engine 54 is transmitted to the engine coupling subassembly 63 by means of the stud 64, tapered output shaft 54S combination. The stud 64 couples torque to the bundt pan 65. Torque from the bundt pan 65 is coupled through the sprag clutch 62 to the external crown spline coupling 67, which in turn couples torque to the internal spline coupling 68 (via the complementary spline teeth 67T, 68T). The internal spline coupling 68 couples torque to the drive shaft 72, which transmits torque to the rotor assembly 100 via the transmission coupling subassembly 74.

The drive shaft 72 of the drive train subassembly 60 is configured as a torque tube, having inside and outside diameters sized to provide torsional softness, i.e., the drive shaft 72 functions as a torsional spring to isolate the coupling spline teeth 67T, 68T, the sprag clutch 62, the transmission gearing (described hereinbelow in further detail), and the rotor assembly 100 from vibratory torque generated by the engine. The configuration of the drive shaft 72 eliminates the need for any additional torsionally soft couplings. The drive shaft 72 is not supported by bearings, thereby reducing the installation weight of the drive train subassembly 60. In addition, the configuration and coupling arrangements, i.e., internal spline coupling 68 and the external crown spline coupling 76, of the drive shaft 72 facilitate maximum axial, angular, and/or parallel misalignments between the rotor assembly 100 and the engine 54 without degrading the functional capabilities thereof.

The mounting arrangement of the sprag clutch 62 and the external crown spline coupling 67 eliminates undesirable loads that could adversely affect performance of the sprag clutch 62. Since the external crown spline coupling 67 cannot react a moment, loads transmitted through the external crown spline coupling 67 react through the center of the sprag clutch 62 such that misaligning moments that could degrade clutch performance are not generated. Loads developed by the integrated flywheel/generator subassembly 55 are coupled into the bundt pan 65 and are effectively canceled in the bundt pan 65 adjacent the stud 64.

Preferably, the UAV 10 of the present invention includes an inlet screen 14, disposed as partially illustrated in FIG. 1, to protect the rotor assembly 100 from FOD. The UAV 10 may also include an outlet screen (not illustrated) to similarly protect the rotor assembly 100.

Figure 4:
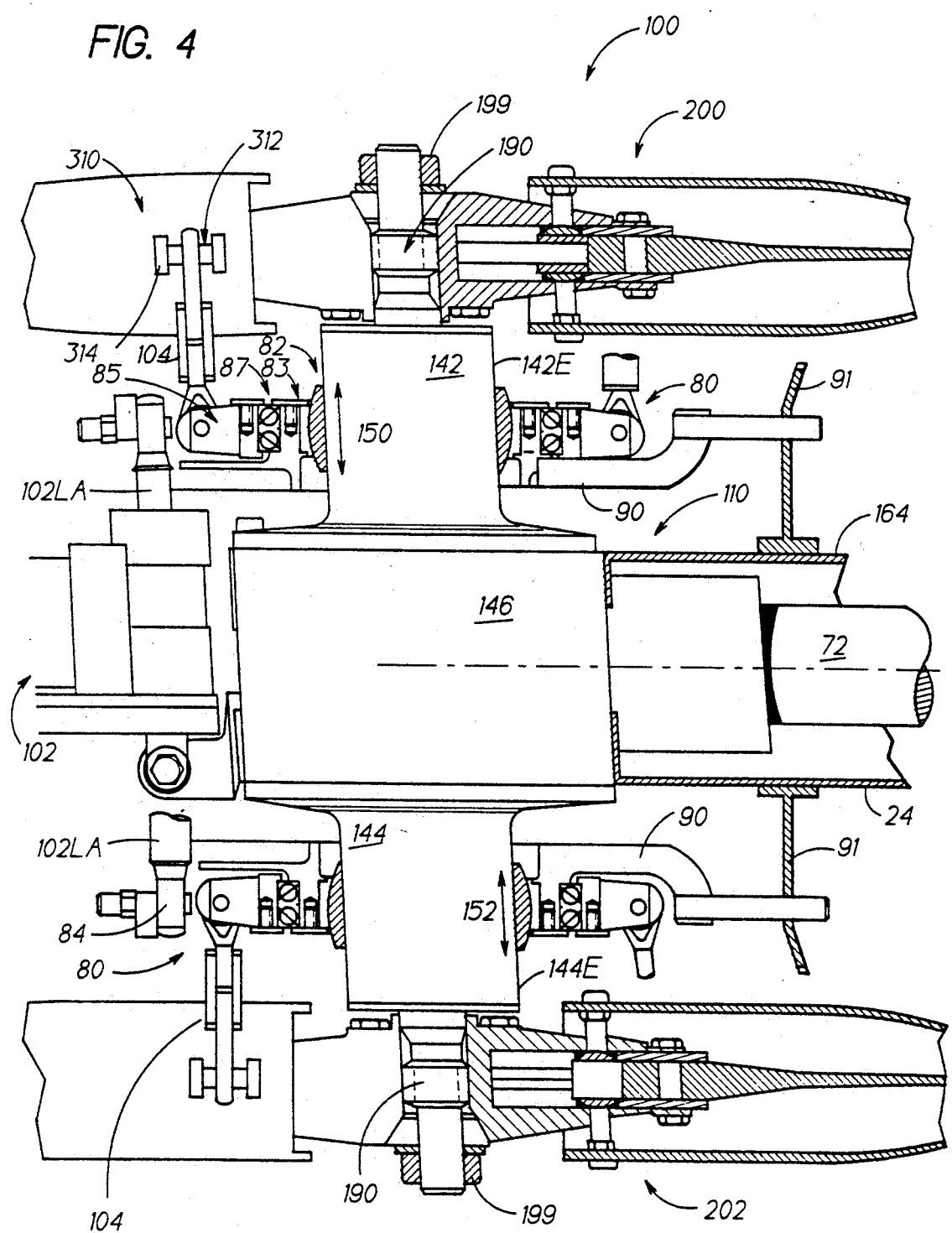
FIG. 4 is a partial plan view illustrating one embodiment of a rotor assembly for the UAV according to the present invention.

One embodiment of the rotor assembly 100 of the present invention is illustrated in FIG. 4 and comprises an electronic control servo subsystem 102 that includes linear actuators 102LA, upper and lower stationary swashplate subassemblies 80, a plurality of pitch control rods 104, a coaxial transmission/center hub subassembly 110, upper and lower integrated spline/cone seat subassemblies 190, and upper and lower multi-bladed, counter-rotating rotors 200, 202 integrated in combination with the transmission/center hub subassembly 110. The rotor assembly 100 has a rotational axis 101 (see FIG. 6) that is coaxially aligned with the fuselage axis 12. The rotors 200, 202 are aerodynamically "shrouded" by the toroidal fuselage 20. The rotors 200, 202 are preferably of the rigid rotor type (as opposed to articulated rotors) to reduce the complexity and weight of the rotor assembly 100. Blade pitch changes induced in the counter-rotating rotors 200, 202 are utilized to generate all required lift, pitch, roll, and yaw control of the UAV 10. Such pitch changes are also utilized to regulate the pattern and velocity of airflow over the toroidal shroud 20 and into the rotor assembly 100. Such control of the airflow creates a lifting component on the toroidal shroud 20 that augments the lift provided by the counter-rotating rotors 200, 202. Additional structural and functional features of the counter-rotating rotors 200, 202 are described in further detail hereinbelow.

The electronic control servo subsystem 102 is operative to control the functioning of the upper and lower stationary swashplate subassemblies 80 by coupling inputs from the flight computer 38 of the UAV 10 to the respective swashplate subassemblies 80. The upper and lower stationary swashplate subassemblies 80 are operative, in response to mechanical inputs from the linear actuators 102LA of the electronic control servo subsystem 102, to selectively mechanically couple cyclic pitch inputs and/or collective pitch inputs to the respective counter-rotating rotors 200, 202 by means of the pitch control rods 104, which are mechanically secured at the ends thereof to the swashplate subassemblies 80 and rotor blade assemblies of the counter-rotating rotors 200, 202, respectively.

An electronic control servo subsystem 102 especially designed for a UAV incorporating counter-rotating rotors is illustrated and described in U.S. Pat. No. 5,058,824, entitled SERVO CONTROL SYSTEM FOR A CO-AXIAL ROTARY WINGED AIRCRAFT, which is assigned to the assignee of the present invention, and which is incorporated herein by reference. Conventional swashplate subassemblies, such as those described in the '824 patent, include a rotating swashplate and a stationary swashplate which are operative in combination, through attitude or displacement changes induced in the rotational plane of the rotating swashplate by the stationary swashplate, to provide pitch inputs to the blades of the rotor assembly. In addition, in conventional in-line swashplate subassemblies, the rotating component thereof is located outboard with respect to the stationary component of the swashplate subassembly. Further, the rotor blade - rotor hub attachment joint is outboard of the pitch control rod (which interconnects with the swashplate assembly).

A preferred embodiment of the stationary swashplate subassembly 80 according to the present invention is illustrated in further detail in FIGS. 5A, 5B, and includes a central spherical ball bearing 82, a stationary swashplate 83 of triangular configuration (the star mechanism) having three bearings 84 mounted in combination therewith, a rotating swashplate 85 having four bearings 86 mounted in combination therewith, an annular bearing 87 intermediate the stationary and rotating swashplates 83, 85 to facilitate rotary motion therebetween, a rotating scissor hub plate 88, two rotating scissors 89 mechanically interconnecting the rotating swashplate 85 and the rotating scissor hub plate 88, and two stationary scissors 90 mechanically interconnecting the stationary swashplate 83 to respective stationary scissor supports 91 (see FIG. 4) secured to the coaxial transmission/center hub subassembly 110.

The stationary swashplate 83 is mounted in combination with the central spherical ball 82 and operative for pivotal movement with respect thereto to provide cyclic pitch inputs to the multi-bladed, counter-rotating rotors 200, 202. Such pivotal motion is induced in the stationary swashplate 83 by means of the linear actuators 102LA (see FIGS. 4, 5B) that are coupled to the stationary swashplate 83 by means of the bearings 84. Pivotal motion of the stationary swashplate 83 with respect to the central spherical ball 82 is facilitated by the mechanical interaction between the stationary scissors 90 and the respective scissor supports 91.

Collective pitch inputs to the multi-bladed, counter-rotating rotors 200, 202 are effectuated by bidirectional linear motion of the stationary swashplate 83, central spherical ball 82 combination in response to control inputs from the electronic control servo subsystem 102 (via the linear actuators 102LA). Collective and cyclic pitch inputs are coupled from the stationary swashplate 83 to the rotating swashplate 85. Such pitch inputs are coupled to the multi-bladed, counter-rotating rotors 200, 202 by means of the pitch control rods 104, which are mechanically connected to the rotating swashplate 85 by means of the bearings 86. Mechanical coupling of the pitch control rods 104 to the multi-bladed, counter-rotating rotors 200, 202 is described in further detail hereinbelow.

The swashplate subassembly 80 described hereinabove is design optimized for effective utilization in combination with the coaxial transmission/center hub subassembly 110 as described in further detail hereinbelow. The swashplate subassembly 80 has an in-line configuration wherein the stationary point for pitch inputs, i.e., the bearings 84 of the stationary swashplate 83, is outboard of the rotating point, i.e., the bearings 86 of the rotating swashplate 85, as illustrated in FIG. 5B. The configuration of the swashplate subassembly 80 facilitates mounting of the pitch control rods 104 in combination with the multi-bladed, counter-rotating rotors 200, 202, as described hereinbelow in further detail, approximately in-line with respective snubber assemblies, thereby providing a rotor assembly 100 having a Delta 3 of approximately zero.

Figure 6:
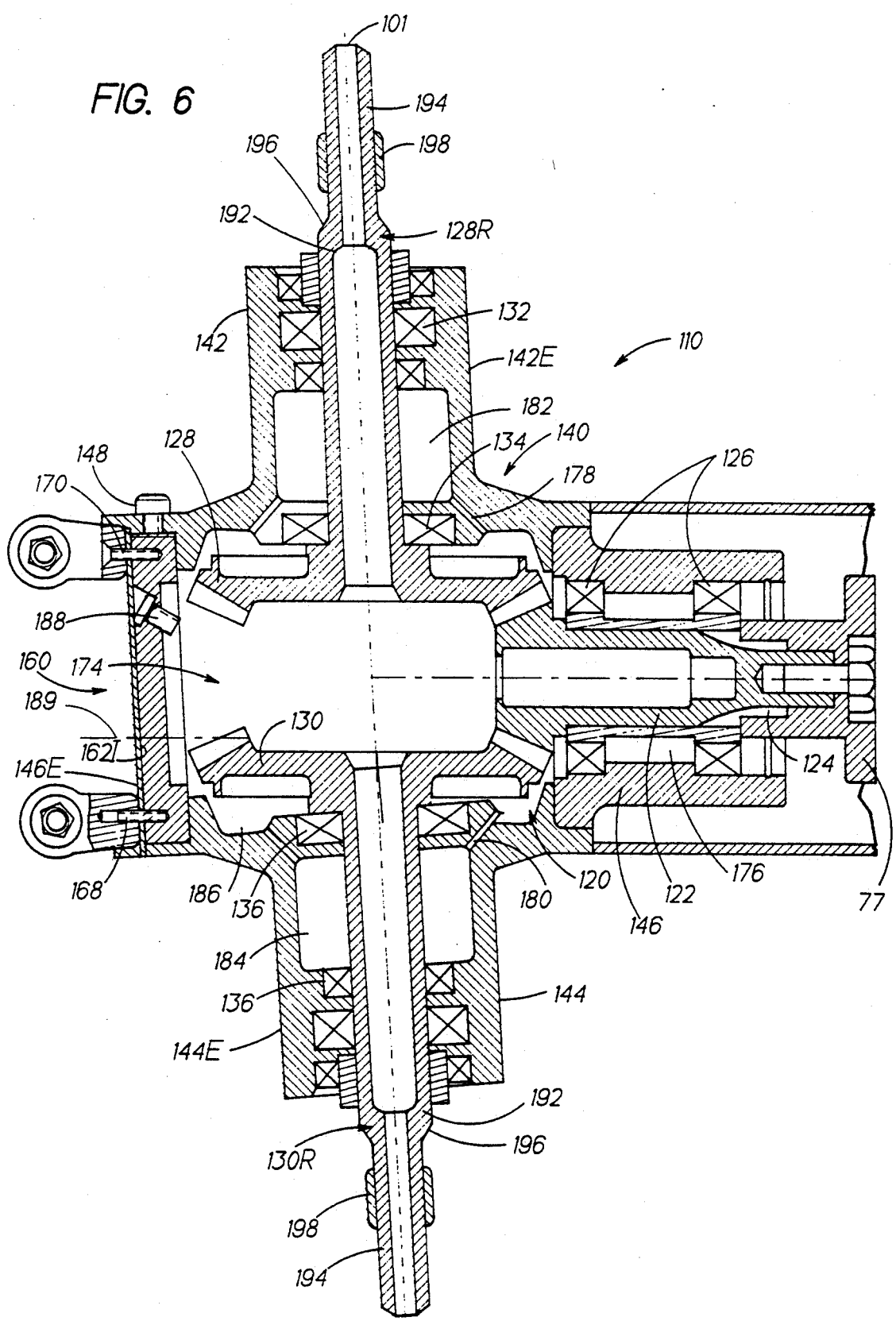
FIG. 6 is a cross-sectional view of one preferred embodiment of a coaxial transmission/center hub subassembly portion for the rotor assembly of FIG. 4.
Figure 7:
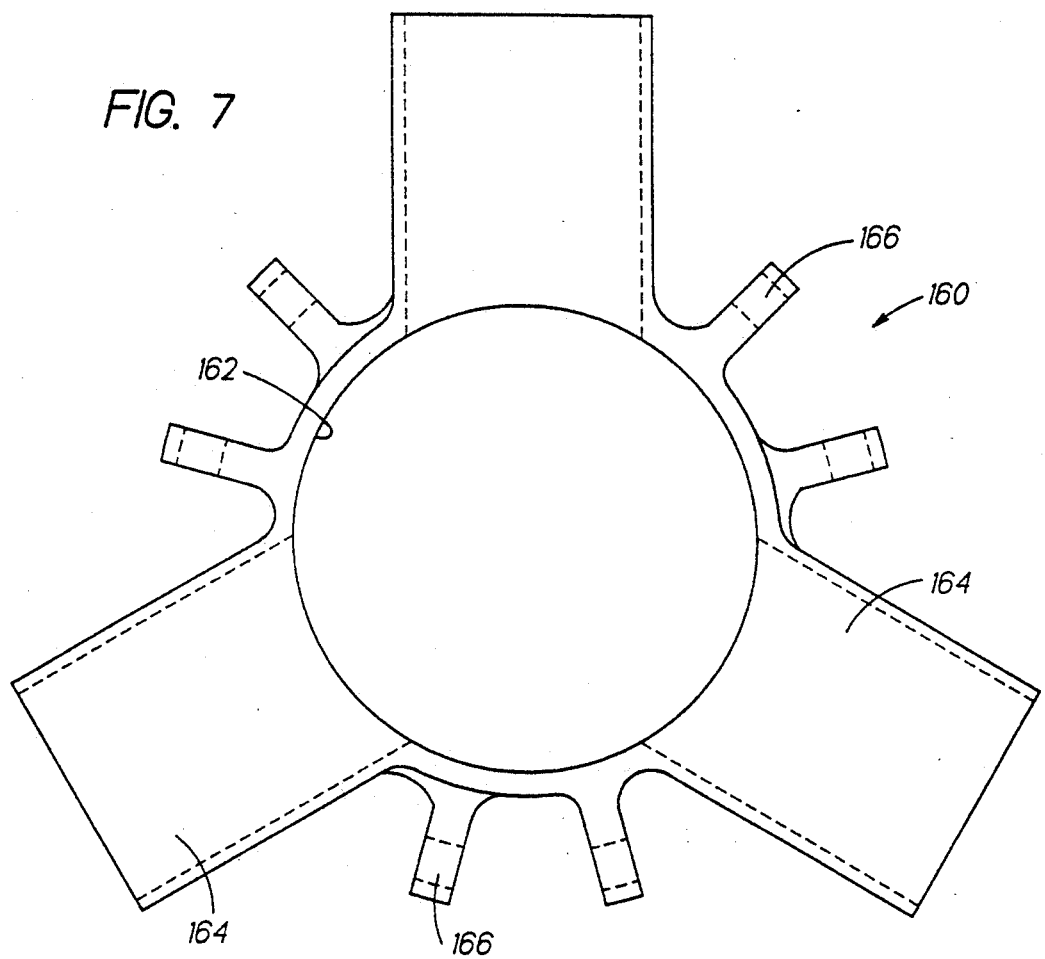
FIG. 7 is a top plan view of the center hub support structure of the coaxial transmission/center hub subassembly of FIG. 6.

One embodiment of the coaxial transmission/center hub subassembly 110 is illustrated in further detail in FIGS. 4, 6-7. The configuration of the transmission/center hub subassembly 110 is design optimized to provide an integrated, low component part system that is lightweight, compact, and structurally and thermally efficient. The transmission/center hub subassembly 110 includes a single stage transmission subsystem 120, a multi-member transmission housing 140, and a center hub support structure 160. The configuration of the transmission/center hub subassembly 110 provides enhanced power transfer efficiency between the powerplant subsystem 50 and the counter-rotating rotors 200, 202, thereby increasing the operational capability and efficacy of the UAV 10.

Further, the transmission/center hub subassembly 110 configuration minimizes the separation between the upper and lower counter-rotating rotors 200, 202, thereby providing a UAV 10 having a compact structural and aerodynamic envelope. The configuration of the transmission/center hub subassembly 110 also facilitates the transfer of the dynamic loads developed by the counter-rotating rotors 200, 202, and reduces airframe vibration levels by providing a direct load path between the upper and lower counter-rotating rotors 200, 202 so that canceling of bending moments produced by the rotors 200, 202 during flight operations occurs. In addition, the transmission/center hub subassembly 110 configuration according to the present invention eliminates the need for transmission mounting brackets.

With reference to FIG. 6, the single stage transmission subsystem 120 comprises an input pinion gear 122 having a splined end portion 124, bearings 126 for mounting the input pinion gear 122 in rotatable combination with the transmission housing 140, and upper and lower spiral bevel gears 128, 130. The upper and lower spiral bevel gears 128, 130 have upper and lower rotor shafts 128R, 130R, respectively, integrally formed therewith, thereby eliminating the need for separate rotor shaft connection means. The transmission subsystem 120 further includes standpipe bearings 132, 134, 136, 138 for rotatably mounting the respective upper and lower rotor shafts 128R, 130R in combination with the transmission housing 140. The integrated spline/cone seat subassembly 190 (upper and lower) for securing the upper and lower multi-bladed rotors 200, 202 in combination with respective rotor shafts 128R, 130R (see FIG. 4) is described in further detail hereinbelow.

The input pinion gear 122 is mechanically coupled to the drive shaft 72 by means of the gear spline coupling 77 (the gear spline coupling 77 mechanically engages the splined end portion 124 of the pinion gear 122), and operative to transmit torque from the engine 54 to the upper and lower spiral bevel gears 128, 130. The placement of the bevel gears 128, 130 vis-a-vis the spiral gear portion of the input pinion gear 122 causes counter rotation of the upper and lower rotor shafts 128R, 130R with respect to one another. The splined end portion 124 of the input pinion gear 122 facilitates quick disconnection of the single stage transmission 120 from the center hub support structure 160.

The multi-member transmission housing 140 includes an upper standpipe housing 142, a lower standpipe housing 144, and a middle housing 146. The upper and lower standpipe housings 142, 144 are secured in combination with the middle housing 146 by means of screws 148 (twelve in number). By mounting the upper and lower standpipe housings 142, 144 in combination with the middle housing 146, direct load paths are provided for the dynamic and static longitudinal, lateral, vertical, and torsional loads developed by the upper and lower counter-rotating rotors 200, 202 into the middle housing 146. This functional feature allows the operating moments of the upper and lower rotors 200, 202 to cancel each other out in the middle housing 146. The cancellation function provided by the configuration of the transmission housing 140 described hereinabove significantly reduces vibratory loads that would normally be transmitted to the toroidal fuselage 20.

The standpipe bearings 132, 134 and 136, 138 are mounted against the internal surface of the upper and lower standpipe housings 142, 144, as illustrated in FIG. 6. The standpipe bearings 132, 134, 136, 138 are operative to facilitate rotary motion of the respective rotor shafts 128R, 130R while transmitting rotor bending loads to the multi-member transmission housing 140, i.e., the upper and lower standpipe housings 142, 144. The respective standpipe bearings 132, 134, and 136, 138 are separated to minimize shear reaction.

The coaxial transmission/center hub subassembly 110 of the present invention utilizes the external surfaces 142E, 144E of the upper and lower standpipe housings 142, 144 as sliding surfaces for the bidirectional translational movement of the respective stationary swashplate subassemblies 80, as indicated by reference numerals 150, 152 in FIG. 4. The range of such bidirectional linear motion is sufficient to couple the requisite collective pitch inputs to respective blades of the counter-rotating rotors 200, 202 for flight operations of the UAV 10. By utilizing the external surfaces 142E, 144E for swashplate motion, a minimum separation between the upper and lower counter-rotating rotors 200, 202 is achieved, thus providing the UAV 10 with a compact structural and aerodynamic envelope.

The embodiment of the coaxial transmission/center hub subassembly 110 illustrated in FIGS. 4, 6–7 includes a separate center hub support structure 160. With reference to FIG. 7, the center hub support structure 160 comprises a cylindrical body 162 having three equidistantly spaced integral support arms 164 extending radially outwardly therefrom. The support arms 164 function as the rigid attachment points for the support struts 24 to mount the coaxial transmission/center hub subassembly 110 in fixed coaxial relation to the toroidal fuselage 20.

The center hub support structure 160 is configured so that the middle housing 146 of the multi-member transmission housing 140 may be slidably inserted therein such that external surfaces 146E of the middle housing 146 abuttingly engage internal surfaces 162I of the center hub support structure 160. The abuttingly engaged surfaces 146E, 162I in combination function as mounting and load bearing surfaces that are operative to transfer the dynamic and static loads developed by the counter-rotating rotors 200, 202 to the center hub support structure 160. The middle housing 146 is secured in combination with the center hub support structure 160 by means of pins 168 (eighteen total) and screws 170 (six total) as exemplarily illustrated in FIG. 6. Dynamic lift loads developed by the counter-rotating rotors 200, 202 are transmitted from the middle housing 146 to the central hub support structure 160 via the pins 168 and screws 170. All other dynamic rotor loads, as well as thermal loads generated by operation of the single stage transmission 120, are coupled from the middle housing 146 to the center hub support structure 160 via the abuttingly engaged surfaces 146E, 162I thereof.

The dynamic and static rotor loads and the thermal loads coupled into the center hub support structure 160 are transmitted into the toroidal fuselage 20, via the support struts 24, by means of the integral support arms 164. Cooling of the coaxial transmission/center hub subassembly 110, and in particular the middle housing 146, is facilitated by the structural arrangement described hereinabove wherein the center hub support structure 160, the support arms 164, and the support struts 24 lie directly in the downwash generated by the upper rotor 200, thereby facilitating convective cooling of such structural elements.

The cylindrical body 162 further includes six mounting lugs 166 extending radially outwardly therefrom as illustrated in FIG. 7. The mounting lugs 166 are utilized to mount the electronic control servo subsystem 102 (more specifically, the three linear actuators 102LA thereof) in combination with the rotor assembly 100.

The coaxial transmission/center hub subassembly 110 further includes a splash lubrication subsystem 174 that provides oil lubrication for the input pinion gear 122, the transmission bearings 126, the upper and lower spiral bevel gears 128, 130, and the standpipe bearings 134, 136, 138. The upper standpipe bearing 132 is grease lubricated due to its location vis-a-vis the splash lubrication subsystem 174. The splash lubrication subsystem 174 includes a pinion chamber 176, cored passages 178, 180, and standpipe chambers 182, 184 formed in the upper and lower standpipe housings 142, 144, respectively, which are fluidically interconnected by means of a central reservoir 186. Access to the central reservoir 186 is provided by means of an oil plug 188. Reference numeral 189 represents the oil fill line for the central reservoir 186.

The standpipe bearings 134, 136, 138, the transmission bearings 126, and the gear teeth of the input pinion gear 122 and the upper and lower spiral bevel gears 128, 130 are oil lubricated by means of the splash lubrication subsystem 174. Oil from the central reservoir 186 is circulated, due to the rotary motion of the upper and lower spiral bevel gears 128, 130, throughout the fluid flow pathways of the splash lubrication subsystem 174 as described in the preceding paragraph to lubricate the aforedescribed components. Since no lubrication pumps are required for the splash lubrication subsystem 174 described hereinabove, the overall system weight and complexity of the UAV 10 is reduced.

The middle housing 146 may be fabricated as an integral element of the center hub support structure 160 to provide an alternative structural embodiment of the coaxial transmission/center hub subassembly 110 described hereinabove. The integrated center hub support structure provides the functions of the middle housing in addition to the functions of the center hub support structure. In this embodiment, however, the securing pins 168 and screws 170 described hereinabove are not required.

The upper and lower integrated spline/cone seat subassemblies 190 of the rotor assembly 100 are operative to secure the upper and lower counter-rotating rotors 200, 202, respectively, in combination with the coaxial transmission/center hub subassembly 110 as illustrated generally in FIG. 4. The integrated spline/cone seat subassembly 190 of the present invention is design optimized to reduce the size/radial dimensions of the upper and lower rotor shafts 128R, 130R, the standpipe bearings 132, 134, 136, 138, the standpipe housings 142, 144, and the upper and lower stationary swashplate subassemblies 80 described hereinabove. The downsizing of these components provides a significant savings in the overall system weight of the UAV 10 according to the present invention.

Traditional rotary aircraft mount the rotor hub in combination with the rotor shaft by means of a spline and cone seat arrangement wherein the two elements are separate and distinct. With reference to FIG. 8, the conventional spline/cone seat arrangement comprises a rotor hub RH having a shaft aperture SA that includes a plurality of spaced apart hub splines HS extending inwardly from the wall thereof, and a countersink CK contiguous with the wall of the shaft aperture SA. The rotor shaft RS includes a complementary plurality of shaft splines SS and a complementary cone seat CS. The rotor hub RH slides downwardly onto the rotor shaft RS so that the hub splines HS are interleaved with the shaft splines SS and the countersink CK abuttingly engages the complementary cone seat CS.

The interleaved hub and shaft splines HS, SS are operative to provide a rotational interlock between the rotor hub RH and the rotor shaft RS while the complementary cone seat CS is operative to provide the mechanical support for the rotor hub RH. The aforedescribed configuration of the conventional spline/cone seat arrangement requires that the shaft aperture SA be large enough to accommodate the shaft splines SS and that the diameter D of the rotor shaft RS be sufficient to provide the complementary cone seat CS support surface. The diameter D of the rotor shaft RS is, therefore, a critical dimension that significantly influences the dimensions of the transmission housing and the swashplate assembly. The conventional spline/cone seat arrangement generally results in a heavy rotor assembly having a large radial dimension.

The integrated spline/cone seat subassembly 190 of the present invention is schematically illustrated in FIG. 9 and in further detail in FIGS. 9A, 9B. With reference to FIG. 9, each rotor shaft 128R, 130R is formed to include a primary shaft portion 192 having a first diameter $D_1$ (the critical diameter), an end shaft portion 194 having a second diameter $D_2$ where $D_1 > D_2$, and a truncated conic transition portion 196 intermediate the portions 192, 194 (see also FIG. 6). The truncated portion 196 makes a predetermined angle $\beta$ with respect to the rotational axis 101, i.e., with the axis of the respective rotor shaft. Each end shaft portion 194 has a plurality of shaft splines 198 extending radially outwardly therefrom. The diameter $D_3$ defined by the outboard, circumferential surfaces of the shaft splines 198 is equal to the critical diameter $D_1$ of the primary shaft portion 192.

Each counter-rotating rotor 200, 202 for the described embodiment of the UAV 10 includes a rotor hub 204 that functions as part of the respective integrated spline/cone seat subassembly 190. Referring to FIGS. 9A, 9B, each rotor hub 204 includes a shaft aperture 206 having a plurality of hub splines 208 extending radially inwardly from the wall defining the shaft aperture 206. The hub splines 208 and the shaft splines 198 are sized to accommodate the torque required by the counter-rotating rotors 200, 202. The specific number and individual thicknesses of the hub splines 208 complement the specific number and individual thicknesses of the shaft splines 198 so that the interleaved hub and shaft splines 208, 198 are operative to provide a rotational interlock between each rotor hub 204 and the corresponding rotor shaft 128R, 130R.

The lower portion of each hub spline 208 has an outwardly tapered portion 210 that makes a predetermined angle $\theta$ with respect to the hub centerline 212, i.e., with respect to the rotational axis 101 (see FIG. 9). The predetermined angle $\theta$ of the outwardly tapered portions 210 of the hub splines 208 is equal to the predetermined angle $\beta$ of the truncated portion 196. The tapered portions 210 of the hub splines 208, therefore, abuttingly engage and are mechanically supported by the truncated conic transition portion 196 of the respective rotor shafts 128R, 130R. Self-locking nuts 199 (see FIG. 4) are threaded onto the ends of the respective rotor shafts 128R, 130R to secure the rotor hubs 204 in interlocked, engaged combination with the respective rotor shafts 128R, 130R.

The critical diameter $D_1$ of the primary shaft portion 192 of the respective rotor shafts 128R, 130R is less than the diameter $D$ of a rotor shaft that incorporates the conventional spline/cone seat arrangement (compare first diameter $D_1$ of FIG. 9 with diameter $D$ of FIG. 8). The critical diameter $D_1$ defines the radial dimensions of the respective rotor shafts 128R, 130R, and, in consequence, the sizing of the standpipe bearings 132, 134, 136, 138, the multi-member transmission housing 140, and the stationary swashplate subassemblies 80.

Each counter-rotating rotor 200, 202 includes the rotor hub 204, four snubber assemblies 230, and four rotor blade assemblies 250. The rotor hub 204 described in the preceding paragraphs additionally comprises four outwardly extending arms 214, each arm 214 having bifurcated ends 216U, 216L having bolt holes 218U, 218L, respectively, formed therethrough as illustrated in FIGS. 9A, 9B. The bifurcated ends 216U, 216L and the respective bolt holes 218U, 218L, in combination, form a clevis 220. Each clevis 220, in combination with a respective bolt, nut, washer set 222, is operative to provide the means for securing the rotor blade assembly 250 in combination with the rotor hub 204 as illustrated in FIGS. 10A, 10B, 10C and as described in further detail hereinbelow.

The rotor hub 204 also functions as an element of the snubber assembly 230. Each outwardly extending arm 214 of the rotor hub 204 further comprises an outboard internal bulkhead 223 and an inboard internal bulkhead 224, which in combination, define a bearing cavity 225, and an inboard cavity 226, as illustrated in FIGS. 9A, 9B. The outboard and inboard internal bulkheads 223, 224 have bolt holes 227, 228, respectively, formed therethrough. The foregoing elements are operative to provide the means for securing the respective snubber assembly 230 in combination with the rotor hub 204 as described in the following paragraphs.

Traditional "bearingless" rotor system designs have the snubber assembly installed outboard of the flexbeam-to-hub attachment joint to reduce the hub length. Such a mounting installation, however, does not facilitate assembly and maintenance of the snubber assembly, and to compensate for such a mounting installation, traditional rotor systems incorporate expensive elastomeric bearings that are more wear resistant than inexpensive self-aligning bearings to minimize maintenance requirements. To utilize an outboard mounting installation in a UAV of the type described herein, the flexbeam of each rotor blade assembly 250 (described in further detail hereinbelow) would require a slotted configuration so that the respective snubber assembly passes through the flexbeam for securement to the upper and lower surfaces of the respective integrated torque tube/spar member. Since this inboard segment of the flexbeam is a highly loaded zone, the flexbeam configuration would have to be widened, which would require wider rotor hub arms, to accommodate the high loading. In addition, the flexbeam-to-hub bolts would have to be located closer to the center of the rotor hub, and would have to be larger to accommodate the corresponding high loading. These features would increase the overall weight of the rotor assembly for the UAV.

The rotor hub 204 configuration described hereinabove facilitates installation of the respective snubber assembly 230 of the present invention inboard of the flexbeam-to-hub attachment joint as illustrated in FIGS. 10A, 10B, 10C. The inboard installation eliminates the need for any structural modifications of the flexbeam, minimizes the width requirements of the hub arms 214, and allows the use of a self-aligning bearing that is less expensive than an elastomeric bearing. The inboard installed snubber assembly 230 is also more accessible for assembly and maintenance, resulting in reduced labor costs for such activities.

The snubber assembly 230 of the present invention is illustrated in further detail in FIGS. 10C, 10D and comprises a spherical bearing 232, a bearing bolt 234, a locking nut 236, a snubber bracket 238 secured in combination with the spherical bearing 232, and securing bolts 240. The spherical bearing 232, snubber bracket 238 combination is rotatably mounted within the bearing cavity 225 by means of the bearing bolt 234 which is inserted through the bolt hole 227, the spherical bearing 232, and the bolt hole 227, respectively. The bearing bolt 234 is secured in combination in the rotor hub 204 by means of the locking nut 236 which is threaded onto the bearing bolt 234 to jam against the bulkhead 223. The securing bolts 240 are utilized to secure the integrated torque tube/spar member 270 in combination with the snubber assembly 230 as described hereinbelow in further detail.

Each counter-rotating rotor 200, 202 includes four rotor blade assemblies 250. Each rotor blade assembly 250 comprises an inner flexbeam 260, an integrated torque tube/spar member 270, an outer aerodynamic fairing or rotor blade 280, and a blade joint 290, as illustrated in FIGS. 10A, 10B. Each rotor blade assembly 250 has a tapered configuration that provides reduced weight, low inertia, a high chord frequency, an improved aerodynamic profile, low static droop, and eliminates high chordwise stresses and the need for blade damping mechanisms.

The flexbeam 260 of the rotor blade assembly 250 is a laminated composite structure that is operative to react the centrifugal loads and a majority of the bending loads developed during operation of the counter-rotating rotors 200, 202. The inboard end 262 of the flexbeam 260 is inserted into the clevis 220 and fastened in combination therewith by means of the bolt, washer, nut sets 222 (two in the illustrated embodiment) to secure the flexbeam 260 in combination with the rotor hub 204 as illustrated in FIGS. 10A, 10B, 10C. The outboard end 264 of the flexbeam 260 is secured in combination with the respective integrated torque tube/spar member 270 and tapered rotor blade 280 by means of the blade joint 290, as described in further detail hereinbelow.

One aspect of rotor blade design involves accounting for the spanwise variation of the resultant velocity vector, which is a combination of the rotational velocity vector acting on the rotor blade and the air inflow velocity vector perpendicular to the rotor plane, acting on the rotor blade. The spanwise variation of the resultant velocity vector results in a variation in the downwash angle, i.e., the angle between the resultant velocity vector and the rotor plane, along the span of tapered rotor blade 280. If the rotor blade has a constant pitch angle along the span, the angle of attack, i.e., the angle between the resultant velocity vector and the airfoil chord, will be less than optimum, resulting in poor rotor blade performance.

To produce a near optimum angle of attack distribution along the span of the tapered rotor blade 280, rotor blade airfoil sections are normally pretwisted. Pretwisted rotor blades are operative to pitch in flight as rigid bodies, i.e., uniformly along the span, in response to control commands to adjust for variations in flight conditions. The spanwise uniform pitch angle can be either constant with respect to blade azimuth position (collective pitch) or sinusoidally variable with respect to blade azimuth position (cyclic pitch).

Whatever the final pitch position of the rotor blade at the outboard joint with the flexbeam, the flexbeam must be twisted to the same angle so that it fits inside the blade spar to form a clean, minimum thickness outside airfoil. If twisting of the flexbeam is all elastic, very high twisting strains are induced in the flexbeam. Generally, the outboard end of the flexbeam is locally pretwisted to accommodate the blade collective pitch required during normal flight modes. For the UAV described herein, however, local pretwisting of only the outboard end of the flexbeam would create high kick loads in the flexbeam laminate, resulting in possible delaminations between plies during operation of the rotor assembly 100.

Figure 13:
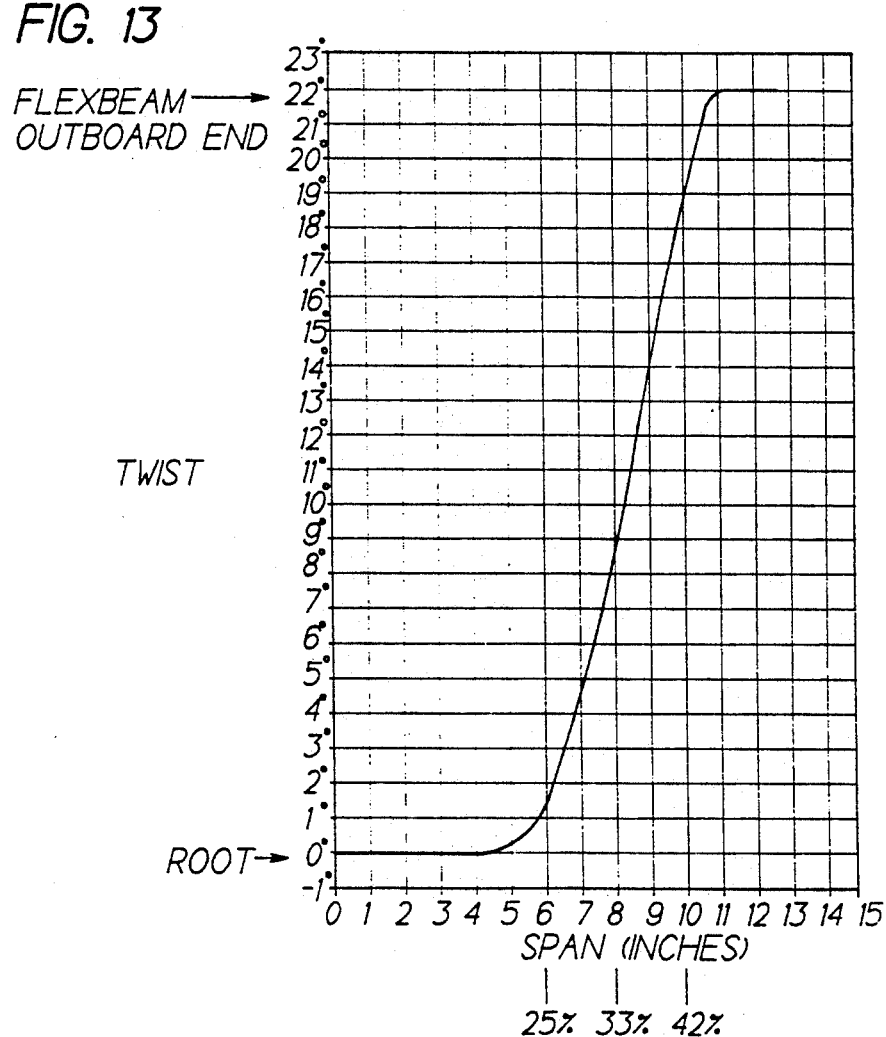
FIG. 13 is a graph defining the pretwist for the flexbeam of the rotor blade assembly according to the present invention.

To compensate for the variable strains induce along the span of the flexbeam, the flexbeam 260 of the present invention is fabricated to have a predetermined linear twist, i.e., built-in twist, along the span thereof (inboard end 262 to outboard end 264). As a result of such pretwisting (which is not explicitly shown in FIGS. 10A, 10B, 10C for purposes of clarity), the pretwisted flexbeam 260 makes an angle with respect to a horizontal plane HP (see FIG. 10B) that varies linearly from about 0° at the inboard end 262 (root section) of the pretwisted flexbeam 260 to about 22° at the outboard end 264 (tip section) of the pretwisted flexbeam 260. The linear pretwist of the flexbeam 260 of the present invention is defined in the graph of FIG. 13

The angle of the pretwisted flexbeam 260 corresponds to the elastic twist that an untwisted flexbeam would normally experience during forward flight of the UAV 10, i.e., rotor blade tip speed of about 700 fps under normal thrust during cruise conditions. As a result, the pretwisted flexbeam 260 is unstrained during such forward flight conditions. The pretwist of the flexbeam 260 also minimizes the flexbeam elastic twist required to accommodate the pitch motion of the rotor blade 280 in all other normal flight modes, i.e., the induced strains are reduced due to the linear pretwist of the flexbeam 260 according to the present invention.

The integrated torque tube/spar member 270 of the rotor blade subassembly 250 is formed as a continuous, single piece, low cost tubular composite structure. The structural configuration of the integrated torque tube/spar member 27 provides high torsional and bending stiffness and facilitates the utilization of the efficient blade joint 290 described in further detail hereinbelow. Conventional rotor blade design, in contrast, generally involves the combination of several structural and nonstructural elements to form the blade subassembly. For example, conventional blade subassemblies usually include separate members for reacting dynamic torsional and bending loads. This design philosophy is deficient inasmuch as it requires separate members to react dynamic loads, and it results in inefficient joints.

Figure 12A:
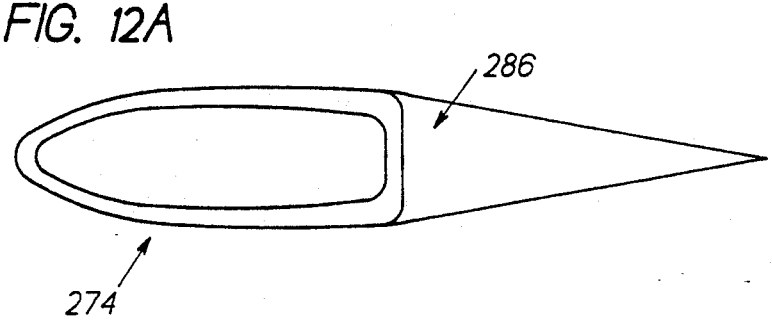
FIG. 12A is a cross-sectional view of the spar segment of the integrated torque tube/spar member of the rotor blade assembly of the present invention.
Figure 12B:
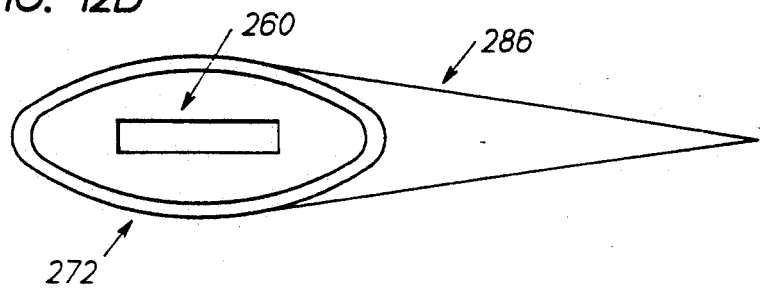
FIG. 12B is a cross-sectional view of the torque tube segment of the integrated torque tube/spar member of the rotor blade assembly of the present invention.

The integrated torque tube/spar member 270 includes an inboard torque tube segment 272 and a outboard spar segment 274, as illustrated in FIG. 10A. The integrated torque tube/spar structure 270 is formed as a continuous filament wound piece that provides a continuous torsion load path and facilitates load coupling from the tapered rotor blades 280 into the respective flexbeams 260. The spar segment 274, which functions as the primary structural member of the rotor blade subassembly 250, has a truncated aerodynamic profile as illustrated in FIG. 12A and is operative to react all bending, torsional, shear, and centrifugal dynamic loads developed during operation of the counter-rotating rotors 200, 202. The torque tube segment 272 has a generally elliptical profile as illustrated in FIG. 12B and is operative to react all torsional loads and some of the bending loads developed during operation of the counter-rotating rotors 200, 202. The inboard end of the torque tube segment 272 is secured in combination with the snubber bracket 238 of the snubber assembly 230 by means of the securing bolts 240 (see FIG. 10C) which extend through the inboard wall of the torque tube segment 274. Pitch inputs from the swashplate subassemblies 80 are coupled into the rotor blade subassemblies 250 of the counter-rotating rotors 200, 202 by means of the respective torque tube segments 272 which are twistable about the bearing bolt 234 of the snubber assembly 230 (FIG. 10D illustrates a torque tube segment 274 in a twisted condition, i.e., pitch input applied thereto).

Rotor systems for conventional rotorcraft are designed to provide an autorotation capability. To facilitate operation of the rotor system in the autorotation mode, conventional rotor blades generally incorporate ancillary mass near the blade tips to increase blade inertia. The relatively high inertia of such rotor blades presents a problem at start up inasmuch as greater engine torque must be provided to initiate rotor blade rotation. The high blade inertia of conventional rotor systems also creates an additional problem inasmuch as such systems result in chordwise natural frequencies near the 1/rev resonance frequency, which is the highest amplitude excitation frequency (see FIG. 11). Operation of a rotor system near the 1/rev resonance mode is generally undesirable due to high induced loading, and in consequence, operation of conventional stiff, in-plane rotor systems is generally constrained to rotor speeds that fall between resonance mode conditions, as exemplarily represented by operating curve CRS in FIG. 11.

The UAV 10 of the present invention does not require an autorotation capability. In consequence, the configuration of the rotor blade 280 of each rotor blade subassembly 250 may be design optimized for reduced weight utilizing composite materials, e.g., high modulus graphite, which results in a tapered rotor blade 280 having a high chord frequency. Each outboard segment of the rotor blades 280 of the present invention is configured to have an aerodynamic taper of about 2:1, which results in a tapered rotor blade 280 having a low outboard mass and a high inboard stiffness. With reference to FIG. 10A where reference numeral 282 defines the aerodynamic root of the rotor blade 280 and reference numeral 282 defines the aerodynamic tip of the rotor blade 280, aerodynamic taper is defined as the ratio of the effective chord at the aerodynamic root 282 to the effective chord at the aerodynamic tip 284.

Figure 11:
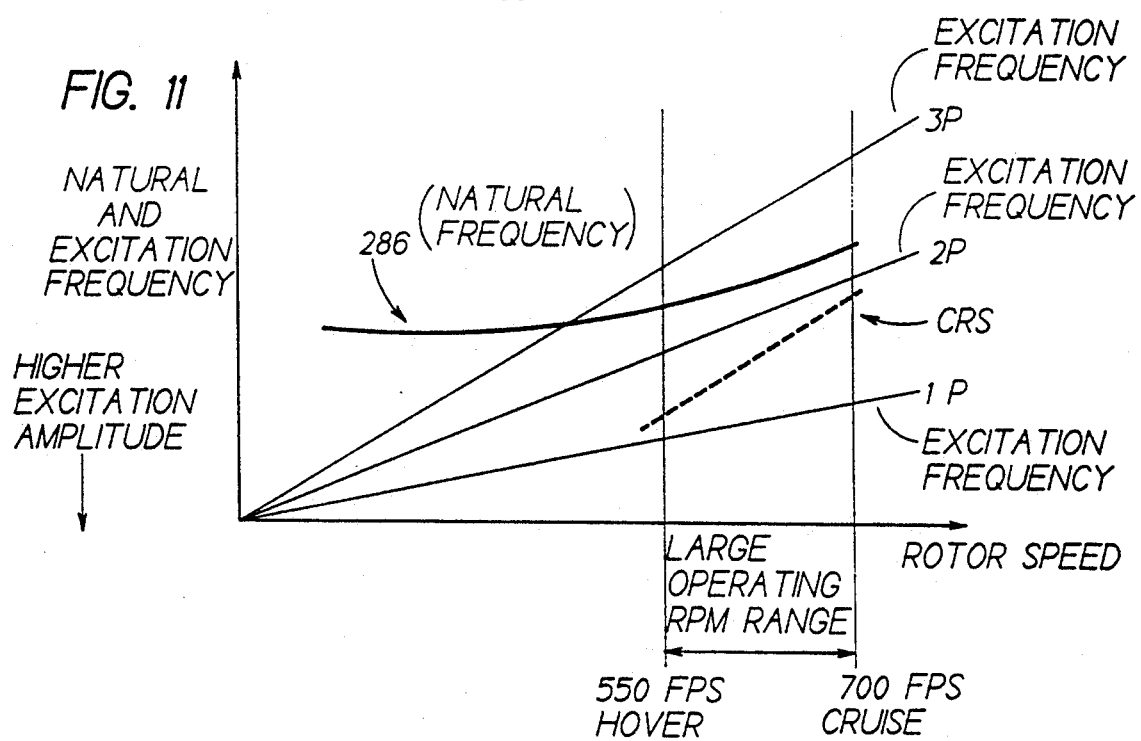
FIG. 11 is a graph depicting the operating curve for the UAV of the present invention vis-a-vis rotor assembly resonance mode conditions.

The aerodynamic taper of the outer rotor blades 280 results in a low moment of inertia about the hub centerline 212 and the mass centroid of each rotor blade 280 being closer to the rotor hub 204. The high chordwise frequency of the tapered rotor blades 280 provides the benefit of rotor operation over a weaker modal response zone, i.e., the high frequency design provided by the tapered rotor blades 280 eliminates operation in critical resonance mode conditions which may occur due to the wide RPM operating range of the UAV 10 of the present invention. Referring to FIG. 11, reference numeral 286 identifies the operating curve of a UAV 10 incorporating rotor blade assemblies 250 having the tapered rotor blade 280 configuration described hereinabove.

For the normal operating range of the UAV 10, i.e., between a 550 fps hover mode and a 700 fps cruise mode (wherein the fps values reflect blade tip speeds), the counter-rotating rotors 200, 202 operate between the 2/rev and 3/rev resonance mode conditions, i.e., generally above 2.5/rev. These resonance mode conditions are lower load conditions in comparison to the 1/rev resonance mode condition, which is the highest load condition (see FIG. 11), such that induced loading of the rotor blade assemblies 250 is reduced. In addition, the high frequency design of the rotor blade assembly 250 eliminates ground and air resonance during UAV 10 operations, and thus eliminates requirements for lag dampers.

Each tapered rotor blade 280 is further configured to include a trailing edge segment 286 of generally triangular shape (see FIGS. 12A, 12B). The trailing edge segment 286 of the rotor blade 280 is a continuous structural member that extends aftwardly from the integrated torque tube/spar member 270 as illustrated in FIGS. 10A, 12A, 12B. The configuration of the trailing edge segment 286 provides a low weight blade configuration that is design optimized for the aerodynamic pressures encountered during operation of the "shrouded" counter-rotating rotors 200, 202.

Figure 14:
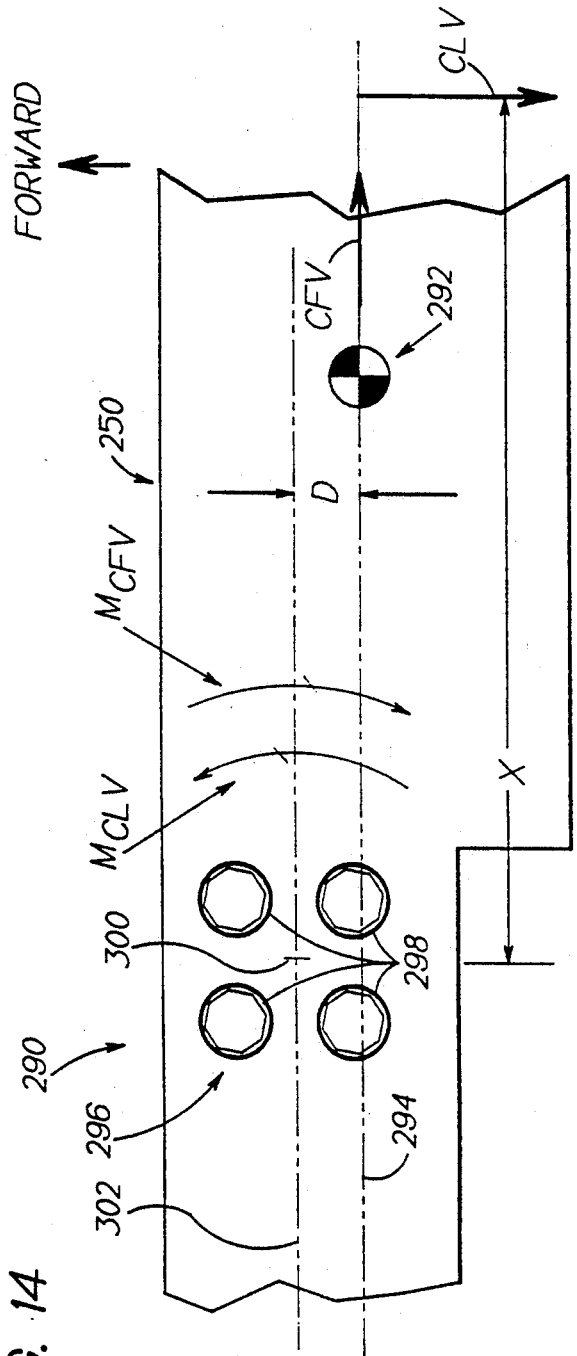
FIG. 14 is a partial plan view depicting the optimal positioning of the blade joint of rotor blade assembly for the UAV of the present invention.

The blade joint 290 of the rotor blade assembly 250 according to the present invention is illustrated generally in FIGS. 10A, 10B and in further detail in FIG. 14. As disclosed hereinabove, the blade joint 290 is operative to secure the pretwisted flexbeam 260 in combination with the respective integrated torque tube/spar member 270 and tapered rotor blade 280. The blade joint 290 of the present invention includes an innovative bolt layout that is optimally positioned to eliminate the moment reaction at the blade joint 290 due to the steady chordwise loading experienced by the rotor blade assembly 250, thereby allowing the utilization of smaller bolts 298 and reduced joint thicknesses.

A conventional rotor blade attachment joint is designed and positioned to react the axial loading resulting from the centrifugal force exerted on the rotor blade during operation thereof. A rotor blade assembly has an identifiable centroid for that portion of the rotor blade assembly mass outboard of the blade attachment joint. Such outboard mass centroid lies on the centroidal axis of the rotor blade assembly. The centrifugal force vector acting on the rotor blade acts through the outboard mass centroid. The conventional attachment joint is designed and positioned such that the center of the attachment joint lies near the centroidal axis such that the centrifugal force vector acts through the attachment joint center, i.e., the attachment joint is subjected to only axial loading due to the centrifugal force vector, there is no in-plane reaction moment at the attachment joint due to the centrifugal force vector.

The conventional attachment joint is further designed to react an in-plane moment arising from the chordwise aerodynamic and inertia loads experienced by the rotor blade assembly during operation thereof. Such a chordwise load vector causes a reaction moment at the attachment joint center. The effect of the chordwise bending moment is to induce large steady stresses in the attachment joint, which reduces the fatigue allowable therein. To compensate for the foregoing effects, a conventional rotor blade attachment joint utilizes heavy bolts and enhanced joint thicknesses.

Referring to FIG. 14, each rotor blade assembly 250 of the present invention has an identifiable outboard mass centroid 292 that lies on the blade centroidal axis 294. The centrifugal force vector CFV acts through the outboard mass centroid 292 as shown. The steady chordwise load vector CLV, which includes aerodynamic as well as inertia loads, acts generally perpendicular to the centroidal axis 294 as illustrated. Since the chordwise load vector CLV includes an aerodynamic load component, the chordwise load vector CLV of the rotor blade assembly 250 does not act through the outboard mass centroid 292.

The blade joint 290 includes a bolt pattern 296 comprised of a plurality of bolts 298 (four in the illustrated embodiment) arranged to define a structural center 300 for the bolt pattern 296. Extending through the bolt pattern structural center 300, parallel to the blade centroidal axis 294, is a bolt pattern center axis 302.

Figure 15:
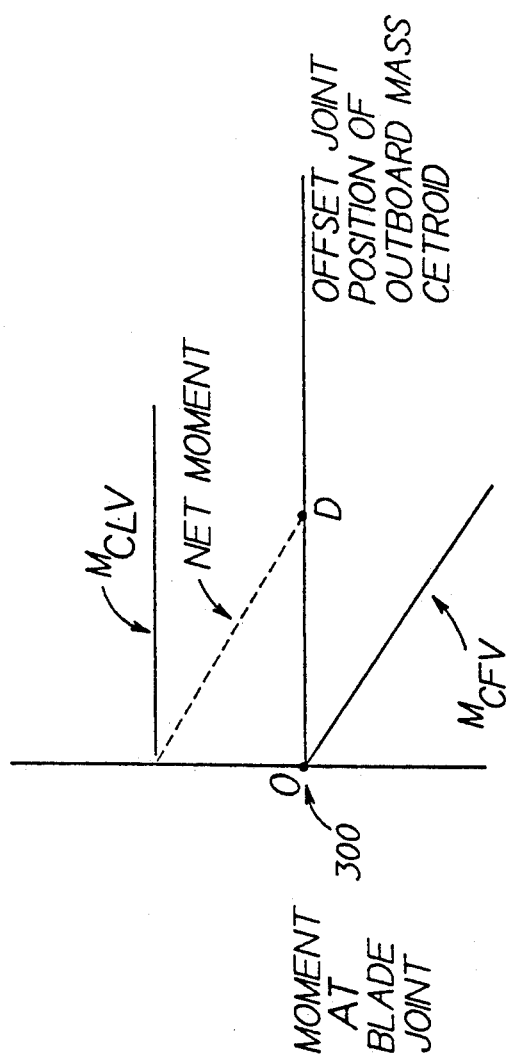
FIG. 15 is a graph showing the offset of the optimal blade joint position with respect to the outboard mass centroid of the rotor blade assembly of the present invention.

According to the present invention, the bolt pattern 296 of the blade joint 290 is disposed in combination with the rotor blade assembly 250 so that the bolt pattern center axis 302 is spaced apart a predetermined distance D from the blade centroidal axis 294. Further, the blade joint 290 is disposed in combination with the rotor blade assembly 250 so that the bolt pattern structural center 300 is spaced apart a predetermined distance X from the steady chordwise load vector CLV (one skilled in aerodynamics, based upon the configuration of the rotor blade assembly 250 and nominal cruise condition of the UAV 10, can compute the predetermined distance X). The location of the bolt pattern 296 with respect to the outboard mass centroid 292 and the chordwise load vector CLV, as defined by the predetermined distances D, X, respectively is such that the reaction moments $M_{CLV}$, $M_{CFV}$ at the blade joint 290 due to the chordwise load vector CLV and the centrifugal force vector CFV, respectively, cancel out, i.e., $M_{CLV}=M_{CFV}$, at the nominal cruise condition of the UAV 10, e.g., blade tip speed of about 700 fps. An examination of FIG. 14 shows that $$(CFV) \times (D) = (CLV) \times (X)$$

since $M_{CLV}=M_{CFV}$. FIG. 15 is a graphical depiction of the predetermined distance D in terms of the moments produced by the centrifugal force vector CFV and the chordwise load vector CLV.

A further examination of FIG. 14 shows that the structural center 300 of the bolt pattern 296 lies forward of the outboard mass centroid 292, i.e., forward of the centroidal axis 292. The functional results described hereinabove could not be achieved by moving the outboard mass centroid 292 aft since the forward position of the outboard mass centroid 292 is required for stability of the rotor blade assembly 250. Positioning of the blade joint 290 as described hereinabove does not affect stability and will only result in a local moment change. Moments at other span locations will remain unaffected.

The blade joint 290 described hereinabove was a bolt pattern 296 formed by four bolts 298. Those skilled in the art will appreciate that other bolt patterns, i.e., more or less than four bolts, may be utilized for the blade joint 290 of the present invention. Any such other bolt pattern must define a bolt pattern structural center and a bolt pattern center axis that provides the predetermined distances D, X described hereinabove.

Figure 16:
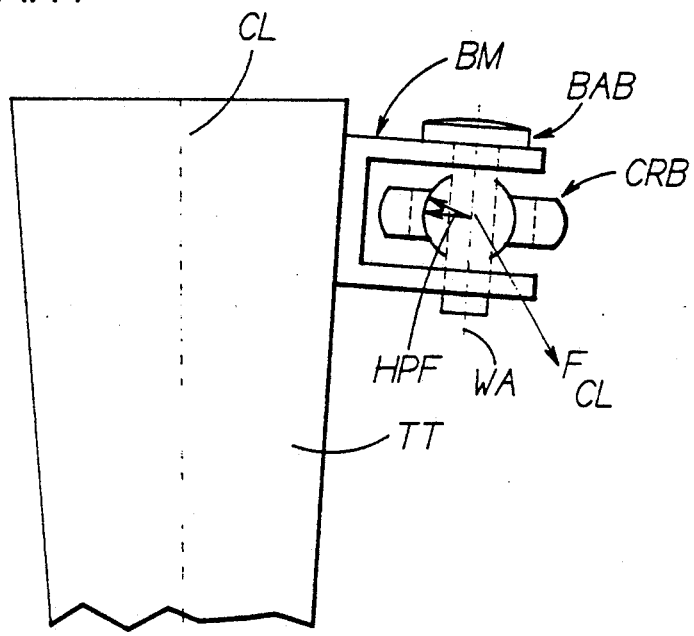
FIG. 16 is a schematic representation of a prior art pitch control rod bearing mounting scheme for a conventional rotor assembly.

Conventional rotor assemblies include a plurality of pitch control rods secured in combination with respective torque tubes of the rotor blade subassemblies. The pitch control rods are operative to couple collective and/or cyclic pitch inputs to individual rotor blades via the respective torque tubes. A conventional mounting scheme for pitch control rods is illustrated in FIG. 16. A control rod bearing CRB is mounted to an end of the pitch control rod (not shown). The control rod bearing CRB is mounted within a bearing mount BM, by means of a bearing attachment bolt BAB, that is rigidly secured to the torque tube TT of the respective rotor blade subassembly. The conventional mounting scheme results in the weak axis WA of the control rod bearing CRB facing outboard, i.e., approximately parallel to the rotor blade centerline CL.

The conventional mounting scheme described in the preceding paragraph is necessary so that the pitch control rods have the required range of motion to impart the full range of pitch inputs to the rotor blades. This mounting scheme is deficient in that the high centrifugal load $F_{CL}$ of the pitch control rod acts in the direction where the control rod bearing CRB is weakest. This causes high pressure forces HPF to be exerted against the bearing liner, which causes the control rod bearing CRB to wear out rather quickly. The replacement frequency for such control rod bearings CRB, due to the effects of centrifugal loading, results in increased maintenance costs and system downtime.

Figure 17:
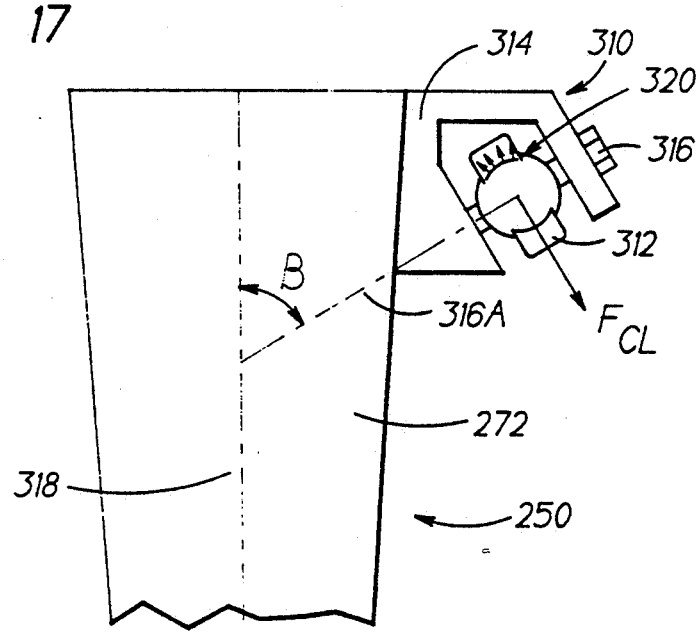
FIG. 17 is a schematic representation of a pitch control rod bearing mounting scheme for the rotor assembly according to the present invention.

The rotor assembly 100 of the present invention does not require the full range of pitch inputs required by conventional rotor assemblies. As a result, the range of motion for the pitch control rods 104 (see FIG. 4) is less than the range of motion required by conventional rotor assemblies. In consequence, the rotor assembly 100 of the present invention utilizes an optimized pitch control rod mounting scheme 310 as illustrated generally in FIG. 4 and in further detail in FIG. 17.

A control rod bearing 312 is mounted to the end of a respective pitch control rod 104 (see FIG. 4). The control rod bearing 312 is mounted within a bearing mount 314 having a clevis configuration by means of a bearing attachment bolt 316. The bearing mount is rigidly secured to the torque tube segment 272 of the respective rotor blade subassembly 250. The bearing mount 314 is configured so that the axis 316A of the bearing attachment bolt 316 makes an angle $\beta$ with respect to the centerline 318 of the rotor blade subassembly 250. The angle $\beta$ corresponds to the direction of centrifugal loading $F_{CL}$ such that the pressure forces 320 acting on the control rod bearing 312 as a result of centrifugal loading $F_{CL}$ are exerted against the strongest part of the control rod bearing 312.

The optimized pitch control rod mounting scheme 310 described hereinabove results in the pressure forces 320 acting on the strongest part of the control rod bearing 312. As a result, the optimized pitch control rod mounting scheme 310 results in longer effective lifetimes for the control rod bearings 312.

A variety of modifications and variations of the present invention are possible in light of the above teachings. It is therefore to be understood that, within the scope of the appended claims, the present invention may be practiced otherwise than as specifically described hereinabove.

What is claimed is:

1. An integrated spline/cone seat subassembly for a rotor assembly, comprising:
   a rotor shaft having an axis, said rotor shaft including
      a primary shaft portion having a first diameter,
      an end shaft portion having a second diameter and having a plurality of shaft splines extending radially outwardly therefrom, and
      a conic transition portion intermediate said primary and end shaft portions, said conic transition portion making a predetermined angle with respect to said axis of said rotor shaft; and
   a rotor hub having a centerline, said rotor hub having a shaft aperture having a plurality of hub splines extending radially inwardly therefrom, each of said hub spline having an outwardly tapered lower portion that makes a predetermined angle with respect to said centerline;
   said predetermined angle of said outwardly tapered lower portion of each of said hub splines being equal to said predetermined angle of said conic transition portion of said rotor shaft wherein said tapered lower portions of said hub splines abuttingly engage and are mechanically supported by said conic transition portion of said rotor shaft in the rotor assembly;

said plurality of hub splines and said plurality of shaft splines are interleaved in combination to provide a rotational interlock between said rotor hub and said rotor shaft in the rotor assembly.

2. The integrated spline/cone seat subassembly of claim 1 wherein said plurality of shaft splines have outboard surfaces defining a circumference having a third diameter, and wherein said third diameter is equal to said first diameter of said rotor shaft.

* * * * *